US009671650B2

(12) United States Patent
Miyake et al.

(10) Patent No.: US 9,671,650 B2
(45) Date of Patent: ***Jun. 6, 2017

(54) METHOD FOR MANUFACTURING LIQUID CRYSTAL DISPLAY DEVICE

(71) Applicant: Sharp Kabushiki Kaisha, Osaka-shi, Osaka (JP)

(72) Inventors: Isamu Miyake, Osaka (JP); Koichi Miyachi, Osaka (JP); Yuko Teraoka, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,684

(22) Filed: Jun. 10, 2016

(65) Prior Publication Data

US 2016/0282678 A1 Sep. 29, 2016

Related U.S. Application Data

(63) Continuation of application No. 14/240,418, filed as application No. PCT/JP2012/069561 on Aug. 1, 2012, now Pat. No. 9,405,153.

(30) Foreign Application Priority Data

Aug. 25, 2011 (JP) .................................. 2011-183797

(51) Int. Cl.
*G02F 1/1341* (2006.01)
*G02F 1/1337* (2006.01)
*G02F 1/1339* (2006.01)

(52) U.S. Cl.
CPC ...... *G02F 1/133788* (2013.01); *G02F 1/1339* (2013.01); *G02F 1/1341* (2013.01); *G02F 2001/13415* (2013.01); *G02F 2001/133738* (2013.01)

(58) Field of Classification Search
CPC .......................... G02F 1/133788; G02F 1/1341
USPC .................................. 349/189, 153, 190, 124
See application file for complete search history.

(56) References Cited

PUBLICATIONS

Miyake et al., "Method for Manufacturing Liquid Crystal Display Device", U.S. Appl. No. 14/240,418, filed Feb. 24, 2014.

*Primary Examiner* — Thanh-Nhan P Nguyen
(74) *Attorney, Agent, or Firm* — Keating & Bennett, LLP

(57) ABSTRACT

The present invention provides a method for manufacturing a liquid crystal display device capable of suppressing display unevenness around a seal in the case of performing PS treatment on a horizontal alignment film formed from a photoactive material. The method for manufacturing a liquid crystal display device of the present invention includes the steps of: forming a horizontal alignment film containing a photoactive material on at least one substrate of a pair of substrates; dropping a liquid crystal composition containing a liquid crystal material and a monomer on one of the pair of substrates, the monomer being contained in an amount of 1.0% by weight or less in the whole liquid crystal composition; curing a sealing material applied to one substrate of the pair of substrates along an outer edge thereof by irradiating the sealing material with light whose wavelength is 40 nm or more longer than an absorption wavelength edge of the monomer; and forming a polymer layer that controls the alignment of liquid crystal molecules adjacent thereto on the horizontal alignment film by irradiating the liquid crystal composition sealed between the pair of substrates with light to polymerize the monomer.

13 Claims, 5 Drawing Sheets

Portion without voltage (AC) application

Portion with voltage (AC) application

Portion without voltage (AC) application

Portion with voltage (AC) application

US 9,671,650 B2

METHOD FOR MANUFACTURING LIQUID CRYSTAL DISPLAY DEVICE

TECHNICAL FIELD

The present invention relates to a method for manufacturing a liquid crystal display device. More specifically, the present invention relates to a method for manufacturing a liquid crystal display device suitable for the cases of forming a polymer layer for improving properties on a horizontal alignment film that is formed by photo-alignment treatment.

BACKGROUND ART

Liquid crystal display (LCD) devices are display devices which control the alignment of birefringent liquid crystal molecules to control the transmission/shielding of light (on/off of display). Examples of display modes of the LCDs include a vertical alignment (VA) mode in which liquid crystal molecules with negative anisotropy of dielectric constant are aligned vertically to a substrate surface; an in-plane switching (IPS) mode and a fringe field switching (FFS) mode, in which liquid crystal molecules with positive or negative anisotropy of dielectric constant are aligned horizontally to a substrate surface and a horizontal electric field is applied to a liquid crystal layer.

Among these modes, a multi-domain vertical alignment (MVA) mode utilizing liquid crystal molecules with negative anisotropy of dielectric constant and alignment-regulating structures (e.g. banks (ribs), hollow portions (slits) of electrodes) is capable of aligning the liquid crystal molecules in multiple directions during voltage application even without rubbing treatment on an alignment film, and is excellent in viewing angle characteristic. In conventional MVA-LCDs, however, upper portions of the ribs or upper portions of the slits serve as the boundaries of alignment division of the liquid crystal molecules, deteriorating the transmissivity during white-image display and causing dark lines in displayed images. Thus, there is room for improvement.

Therefore, alignment-stabilizing techniques using a polymer (hereinafter, also referred to as polymer sustained (PS) techniques) have been suggested as methods of producing LCDs with high luminance and high response speed (for example, see Patent Literatures 1 to 8). In a pre-tilt-angle-imparting technique using a polymer (hereinafter, also referred to as a polymer sustained alignment (PSA) technique) among these PS techniques, a liquid crystal composition containing a polymerizable component such as a polymerizable monomer and oligomer is sealed between the substrates, and the monomer is polymerized with the liquid crystal molecules being tilted (inclined) by a voltage applied between the substrates, thereby forming a polymer. This provides liquid crystal molecules tilted with a predetermined pre-tilt angle even after the voltage application is stopped, and the alignment direction of the liquid crystal molecules is controlled to a certain direction. The monomer is selected from a material polymerizable by heat, light (ultraviolet light). The liquid crystal composition may contain a polymerization initiator for initiating the polymerization of the monomer (for example, see Patent Literature 4).

On the other hand, a photo-alignment technique has been recently studied as a technique for achieving an excellent viewing angle characteristic; this technique is capable of aligning the liquid crystal molecules in multiple directions during voltage application even without rubbing treatment on an alignment film, and is capable of achieving an excellent viewing angle characteristic. The photo-alignment technique is a technique in which an alignment film is formed from a photoactive material and the film is irradiated with light (e.g. ultraviolet light), thereby giving an alignment-regulating force to the alignment film.

Some recent papers disclose that combination use of such a photo-alignment (PA) technique, a rubbing technique, and the aforementioned PS technique for improving the alignment stability in liquid crystal display devices of the IPS mode can provide good results (for example, see Non-Patent Literature 1).

CITATION LIST

Patent Literature
Patent Literature 1: Japanese Patent No. 4175826
Patent Literature 2: Japanese Patent No. 4237977
Patent Literature 3: JP 2005-181582 A
Patent Literature 4: JP 2004-286984 A
Patent Literature 5: JP 2009-102639 A
Patent Literature 6: JP 2009-132718 A
Patent Literature 7: JP 2010-33093 A
Patent Literature 8: U.S. Pat. No. 6,177,972
Non-Patent Literature
Non-Patent Literature 1: Y. Nagatake, et al, ITE and SID, "Hysteresis Reduction in EO Characteristics of Photo-Aligned IPS-LCDs with Polymer-Surface-Stabilized Method", IDW '10, 89-92, LCT p 2-5, 2010. 12

SUMMARY OF INVENTION

Technical Problem

The current photo-alignment technique has been adopted mainly for mass production of TVs using a vertical alignment film (e.g. VA mode) and has not yet been adopted for mass production of TVs using a horizontal alignment film (e.g. IPS mode). This is because the use of a horizontal alignment film causes large-scale image sticking in liquid crystal display. The image sticking is the following phenomenon: when a constant voltage is continuously applied to a part of a liquid crystal cell for a certain period of time and then the whole image is changed to another image, the brightness at the portion where the voltage has been continuously applied seems to differ from the brightness at the portion where no voltage has been applied.

FIG. 6 is a schematic view showing the state of image sticking in a liquid crystal cell of an IPS mode produced with photo-alignment treatment. As shown in FIG. 6, the brightness at the portion with voltage (AC) application significantly differs from that at the portion without voltage (AC) application, and it is found that image sticking occurs to an extremely large degree in the portion with voltage (AC) application. Suppression of image sticking requires formation of a polymer layer that has a stable alignment-regulating force obtained by the PS technique, and this requires promotion of the polymerization for PS step.

The present inventors thus have studied introduction of a polymer stabilization (PS) step in production of a liquid crystal cell of the IPS mode obtained by photo-alignment treatment; in this step, a polymerizable monomer is added to a liquid crystal, and the polymerizable monomer is polymerized by heat or light to form a polymer layer on the surface constituting the boundary with the liquid crystal layer. FIG. 7 is a schematic view showing the state of image sticking in a liquid crystal cell of an IPS mode produced with photo-alignment treatment and a PS step. As shown in FIG. 7, the brightness is hardly different between the portion with voltage (AC) application and the portion without voltage (AC) application, and it is found that image sticking at the portion with voltage (AC) application is greatly suppressed. As mentioned here, introduction of the PS step into a conventional method greatly suppresses image sticking.

The present inventors have performed various studies on causes of large-scale image sticking especially in liquid crystal cells of the IPS mode, and thereby have found that image sticking in liquid crystal cells of the IPS mode and that in liquid crystal cells of the VA mode are caused by different mechanisms. In the VA mode, image sticking occurs due to remaining (memory) of the tilt in the polar angle direction; in the IPS mode, image sticking occurs due to remaining (memory) of the alignment in the azimuth direction and formation of an electrical double layer. The present inventors have further studied to have found that these phenomena are attributed to the material of a photo-alignment film.

The present inventors have furthermore studied to have found that the improvement effects of the PS step are especially effective with an alignment film formed from a photoactive material; for example, the improvement effects of the PS step are not achieved with an alignment film which is formed from a photoinactive material and which is subjected to rubbing treatment or subjected to no alignment treatment.

Based on the studies by the present inventors, the reason why it is suitable to combine an alignment film formed from a photoactive material and the PS step is as follows. FIG. 8 is a schematic view showing for comparison the state of polymerization of a polymerizable monomer when an alignment film formed from a photoinactive material is subjected to a PS step. FIG. 9 is a schematic view showing for comparison the state of polymerization of a polymerizable monomer when an alignment film formed from a photoactive material is subjected to a PS step. As shown in FIG. 8 and FIG. 9, the PS step includes: irradiating a pair of substrates and a liquid crystal composition filled into between the pair of substrates with light (e.g. ultraviolet light) so as to initiate chain polymerization (e.g. radical polymerization) of a polymerizable monomer 33 or 43 in the liquid crystal layer; and depositing the formed polymer on a surface of an alignment film 32 or 42 at the side of a liquid crystal layer 30 to form a polymer layer (hereinafter, also referred to as a PS layer) for controlling the alignment of the liquid crystal molecules.

With a photoinactive alignment film 42, as shown in FIG. 8, polymerizable monomers 43a which are to be excited by light irradiation are uniformly generated in the liquid crystal layer 30. Excited polymerizable monomers 43b are photo-polymerized to form a polymer layer at the interface between the alignment film 42 and the liquid crystal layer 30 owing to phase separation. Thus, the PS step includes movement of the excited polymerizable monomers 43b in the bulk toward the interface between the alignment film 42 and the liquid crystal layer 30 after photo-polymerization.

On the other hand, with a photoactive alignment film 32, as shown in FIG. 9, a larger number of excited polymerizable monomers 33b are formed. This is because the alignment film 32 absorbs the light applied and the excitation energy thereof is transferred to polymerizable monomers 33a. The polymerizable monomers 33a near the alignment film 32 are likely to become excited polymerizable monomers 33b owing to the excitation energy. In other words, a larger number of polymerizable monomers 33a which are to be excited by light irradiation in the liquid crystal layer are unevenly distributed near the interface between the alignment film 32 and the liquid crystal layer 30. Thus, with such a photoactive alignment film 32, the movement of the excited polymerizable monomers 33b toward the interface between the alignment film 32 and the liquid crystal layer 30 occurs in a negligible level after photo-polymerization. This increases the rates of polymerization and of forming a polymer layer, resulting in formation of a PS layer having a stable alignment-regulating force.

The present inventors have studied to have found that the PS layer shows the effect of suppressing image sticking better for horizontal alignment films than for vertical alignment films. This is presumably because as follows. FIG. 10 is a schematic view showing the state of polymerizing a polymerizable monomer onto a vertical alignment film. FIG. 11 is a schematic view showing the state of polymerizing a polymerizable monomer onto a horizontal alignment film.

In the case of a vertical alignment film as shown in FIG. 10, photoactive groups 52 included in the vertical alignment film are in indirect contact with liquid crystal molecules 54 and polymerizable monomers 53 via hydrophobic groups 55. Thus, the excitation energy is less likely to be delivered from the photoactive groups 52 to the polymerizable monomers 53.

On the other hand, in the case of a horizontal alignment film as shown in FIG. 11, photoactive groups 62 included in the horizontal alignment film are in direct contact with liquid crystal molecules 64 and polymerizable monomers 63. Thus, the excitation energy is easily delivered from the photoactive groups 62 to the polymerizable monomers 63. This increases the rates of polymerization and of forming a polymer layer, resulting in formation of a PS layer having a stable alignment-regulating force.

Therefore, the PS step is capable of more markedly improving the efficiency of delivering the excitation energy and of more greatly suppressing image sticking when performed on an alignment film which is formed from a photoactive material and which is a horizontal alignment film.

As is evident from the above description, what is essential for improving the rate of forming a PS layer and suppressing image sticking is not to perform photo-alignment treatment but to use a photoactive material. Further, what is essential for delivering the excitation energy between the alignment film and the polymerizable monomer is not photoisomerization and photocross-linking, which are mechanisms of photo-alignment, but photoexcitability.

However, the present inventors have further studied to have focused on display unevenness at the periphery of the display area along a sealing material for bonding the substrates of a liquid crystal display panel in the case of the PS treatment on a horizontal alignment film formed from a photoactive material. FIG. 12 is a photograph showing display unevenness at the periphery of the display area in a liquid crystal display panel. A sealing material is applied along the outer edge of the substrate, and thus display unevenness occurs along the periphery of the display area. Such display unevenness does not occur, for example, in the case where the PS treatment is performed on a vertical alignment film or in the case where the PS treatment is not performed and simply a horizontal alignment film is formed from a photoactive material, but uniquely occurs in the case where the PS treatment is performed on a horizontal alignment film formed from a photoactive material. This is presumably attributed to the difference in reactivity to the PS polymerization. A horizontal alignment film formed from a photoactive material has very high reactivity to the PS step, and thus the polymerization may possibly proceed due to a factor other than the PS step.

The present invention is devised in view of such a current situation, and it aims to provide a method for manufacturing a liquid crystal display device capable of suppressing display unevenness around a seal in the case of performing PS treatment on a horizontal alignment film formed from a photoactive material.

Solution to Problem

Various studies by the present inventors have proved that such display unevenness along the periphery of the display area is caused as follows. When a sealing material is preliminarily applied to one of the substrates, a liquid crystal material is dropped on the substrate by a liquid crystal dropping (one drop fill (ODF)) step, and then ultraviolet light is applied for the purpose of seal curing, this ultraviolet light leaks to the display area (active area) and the monomer in the liquid crystal layer starts to react, thereby immobilizing the flow alignment of the liquid crystal. As mentioned above, the system using a polymerizable monomer with a horizontal alignment film formed from a photo-alignment material shows very high reactivity. Thus, even a slight amount of light leaked to the active area initiates the polymerization of the monomer even though the active area is covered with a mask so as to be shielded from the ultraviolet light as well as possible.

The present inventors have performed studies on this problem, and thus have found the following: that is, it is effective as the PS step to initiate polymerization by light irradiation, and use of a material which is curable by irradiation of light whose wavelength is longer than the absorption wavelength of the monomer or use of a thermosetting material as a sealing material suppresses display unevenness around the display area due to light irradiation for the purpose of seal curing. In addition, they have found that unevenness around the display area can be more suppressed by adjusting the monomer concentration in the liquid crystal composition within a range capable of suppressing image sticking and by shielding the display area from light (masking the display area) during light exposure.

The present inventors have furthermore found that not a liquid crystal dropping step (ODF) but a vacuum-injecting step where a liquid crystal composition is injected after seal curing enables to suppress display unevenness around the display area even after light irradiation for the purpose of seal curing.

The present inventors have thereby arrived at the solution to the problems and completed the present invention.

In other words, one aspect of the present invention (hereinafter, also referred to as a first manufacturing method of the present invention) relates to a method for manufacturing a liquid crystal display device, including the steps of: forming a horizontal alignment film containing a photoactive material on at least one substrate of a pair of substrates; dropping a liquid crystal composition containing a liquid crystal material and a monomer on one substrate of the pair of substrates, the monomer being contained in an amount of 1.0% by weight or less in the whole liquid crystal composition; curing a sealing material applied to one substrate of the pair of substrates along an outer edge thereof by irradiating the sealing material with light whose wavelength is 40 nm or more longer than an absorption wavelength edge of the monomer; and forming a polymer layer that controls the alignment of liquid crystal molecules adjacent thereto on the horizontal alignment film by irradiating the liquid crystal composition sealed between the pair of substrates with light to polymerize the monomer.

Another aspect of the present invention (hereinafter, also referred to as a second manufacturing method of the present invention) relates to a method for manufacturing a liquid crystal display device, including the steps of: forming a horizontal alignment film containing a photoactive material on at least one substrate of a pair of substrates; dropping a liquid crystal composition containing a liquid crystal material and a monomer on one substrate of the pair of substrates; curing a sealing material applied to one substrate of the pair of substrates along an outer edge thereof by heating without light irradiation; and forming a polymer layer that controls the alignment of liquid crystal molecules adjacent thereto on the horizontal alignment film by irradiating the liquid crystal composition sealed between the pair of substrates with light to polymerize the monomer.

Another aspect of the present invention (hereinafter, also referred to as a third manufacturing method of the present invention) relates to a method for manufacturing a liquid crystal display device, including the steps of: forming a horizontal alignment film containing a photoactive material on at least one substrate of a pair of substrates; applying a sealing material onto one substrate of the pair of substrates along an outer edge thereof;

bonding the pair of substrates; curing the sealing material; vacuum-injecting a liquid crystal composition containing a liquid crystal material and a monomer into between the pair of substrates; and forming a polymer layer that controls the alignment of liquid crystal molecules adjacent thereto on the horizontal alignment film by irradiating the liquid crystal composition sealed between the pair of substrates with light to polymerize the monomer.

Another aspect of the present invention (hereinafter, also referred to as a fourth manufacturing method of the present invention) relates to a method for manufacturing a liquid crystal display device, including the steps of: forming a horizontal alignment film containing a photoactive material on at least one substrate of a pair of substrates; dropping a liquid crystal composition containing a liquid crystal material and a monomer on one substrate of the pair of substrates, the monomer being contained in an amount of 0.4% by weight or less in the whole liquid crystal composition; curing a sealing material applied to one substrate of the pair of substrates along an outer edge thereof by irradiating the sealing material with light whose wavelength is 10 nm or more longer than an absorption wavelength edge of the monomer while shielding a display area from the light; and forming a polymer layer that controls the alignment of liquid crystal molecules adjacent thereto on the horizontal alignment film by irradiating the liquid crystal composition sealed between the pair of substrates with light to polymerize the monomer.

The configuration of the method for manufacturing a liquid crystal display device of the present invention is not especially limited by other components as long as it essentially includes such components. The following will specifically describe the method for manufacturing a liquid crystal display device and preferable modes thereof. Any combinations of two or more of the following modes of the method for manufacturing a liquid crystal display device are also preferable modes of the method for manufacturing a liquid crystal display device.

The first to fourth manufacturing methods of the present invention include the step of forming a horizontal alignment film containing a photoactive material on at least one substrate of a pair of substrates. It is preferable to form a horizontal alignment film containing a photoactive material on each of the pair of substrates. The horizontal alignment film is a film for aligning the liquid crystal molecules adjacent thereto substantially horizontally to the surface of the horizontal alignment film. The excitation energy generated during light application onto a photoactive material is more efficiently delivered from a horizontal alignment film to a monomer than from a vertical alignment film to a monomer. Thus, a horizontal alignment film enables to form a PS layer having a more stable alignment-regulating force.

In such a case, the alignment mode of the liquid crystal display device produced by each of the manufacturing methods is preferably one of an IPS mode, an FFS mode, an optically compensated bend (OCB) mode, a twisted nematic (TN) mode, a super twisted nematic (STN) mode, a ferroelectrics liquid crystal (FLC) mode, a polymer dispersed liquid crystal (PDLC) mode, or a polymer network liquid crystal (PNLC) mode, each of which can utilize a horizontal alignment film. Preferred are the IPS mode and the FFS mode; these modes are easily performed and are excellent in mass productivity because only one operation of applying polarized light from the front side of the substrate can provide desired alignment. In particular, a liquid crystal display device of the FFS mode includes a plate-like electrode (plate electrode) in addition to slitted electrodes. In the case of bonding the substrates using an electrostatic chuck, for example, the plate electrode serves as a blocking wall for preventing a high voltage from being applied to the liquid crystal layer. Thus, the FFS mode particularly excellently improves the efficiency of production process.

The above alignment mode is also preferably applied to a structure in which a multi-domain structure is formed on at least one of the pair of substrates for the purpose of improving the viewing angle characteristic. The multi-domain structure is a structure that includes multiple regions with different alignment modes (for example, bend directions in the OCB mode or twist directions in the TN and STN modes) or alignment directions of the liquid crystal molecules when no voltage is applied or a voltage is applied, or both of them. Formation of a multi-domain structure requires, for example, patterning of electrode into an appropriate shape or using a photomask during application of light to a photoactive material, or both of such treatments, in a positive manner.

The horizontal alignment film contains a photoactive material. A photoactive material in the horizontal alignment film material leads to excitation of a base material during photopolymerization of a monomer, for example, so that the excitation energy or a radical moves to the monomer. This improves the reactivity in formation of a PS layer. Further, the horizontal alignment film may be subjected to photo-alignment treatment; in other words, it may be irradiated with light in certain conditions to achieve alignment characteristics. Hereinafter, a polymer film having an ability to control the alignment of the liquid crystal by photo-alignment treatment is also referred to as a photo-alignment film.

Examples of the photoactive material include photochromic compound materials, coloring materials, fluorescent materials, phosphorescent materials, and photo-alignment film materials. The photoactive material preferably contains at least one chemical structure selected from the group consisting of terphenyl derivatives, naphthalene derivatives, phenanthrene derivatives, tetracene derivatives, spiropyran derivatives, spiroperimidine derivatives, viologen derivatives, diarylethene derivatives, anthraquinone derivatives, azobenzene derivatives, cinnamoyl derivatives, chalcone derivatives, cinnamate derivatives, coumarin derivatives, stilbene derivatives, and anthracene derivatives. The benzene ring in each of these derivatives may be a heterocyclic ring. The term "derivative" herein means a compound substituted by a certain atom or functional group, and a compound introduced as a monovalent functional group, or even as a divalent or polyvalent functional group, into the molecular structure. Such derivatives may be in the molecular structure of the polymer main chain or may be in the molecular structure of the polymer side chain, and may be monomers or may be oligomers. In the case where a horizontal alignment film material contains such a monomer or oligomer including a photoactive functional group (preferably in an amount of 3% by weight or more), the polymer itself constituting the horizontal alignment film may be photoinactive. The polymer constituting the horizontal alignment film is preferably a polysiloxane, a polyamide acid, or a polyimide from the viewpoint of heat resistance. The polymer constituting the horizontal alignment film may contain a cyclobutane skeleton.

The photoactive material is more preferably a photo-alignment film material. The photo-alignment film is a polymer film that generates anisotropy thereon by polarized or unpolarized light irradiation and has an ability to give an alignment-regulating force to the liquid crystal. The photo-alignment film material having the aforementioned properties may be a single polymer or may be a mixture with another molecule. For example, the photo-alignment film material may contain a polymer including a photo-alignable functional group in admixture with a low molecular weight molecule such as additives and other photoinactive polymers. For example, the photo-alignment film material may contain a photoinactive polymer in admixture with an additive including a photo-alignable functional group. The photo-alignment film material is selected from materials causing any of photodissociation, photoisomerization, and photodimerization. In comparison with photodissociation, photoisomerization and photodimerization usually allow for alignment with light having a longer wavelength in a lower exposure dose. Thus, they are excellent in mass productivity. Representative materials causing photodissociation are materials including a compound containing a cyclobutane skeleton.

In other words, the material forming the photo-alignment film preferably includes a compound containing either one of or both of a photoisomerizable functional group and a photodimerizable functional group. Representative materials causing photoisomerization or photodimerization are azobenzene derivatives, cinnamoyl derivatives, chalcone derivatives, cinnamate derivatives, coumarin derivatives, diarylethene derivatives, stilbene derivatives, and anthracene derivatives.

The photoisomerizable or photodimerizable functional group is more preferably a cinnamate group or a derivative thereof. These functional groups are especially excellent in reactivity. The benzene ring in each of these functional groups may be a heterocyclic ring.

The horizontal alignment film is preferably a photo-alignment film on which photo-alignment treatment is performed by ultraviolet light, visible light, or both of them. Since the PS layer immobilizes the alignment of the liquid crystal, the liquid crystal layer requires no shielding from ultraviolet light or visible light after production process. Thus, the production process can be selected from a wide range of choice. The horizontal alignment film is preferably a photo-alignment film on which photo-alignment treatment is performed by polarized or unpolarized light. The alignment-regulating force of the horizontal alignment film mainly depends on the type of the photo-alignment film material (photofunctional group), and the alignment azimuth, the degree of pre-tilt angle, and other properties of the liquid crystal molecules may be adjusted depending on the type of light, the period of time of light irradiation, light irradiation intensity, the type of a photofunctional group, and other factors.

The first manufacturing method of the present invention includes the steps of: dropping a liquid crystal composition containing a liquid crystal material and a monomer on one substrate of the pair of substrates, the monomer being contained in an amount of 1.0% by weight or less in the whole liquid crystal composition; and curing a sealing material applied to one substrate of the pair of substrates along an outer edge thereof by irradiating the sealing material with light whose wavelength is 40 nm or more longer than an absorption wavelength edge of the monomer. Irradiation with light whose wavelength is longer than the absorption wavelength edge of the monomer suppresses the polymerization of the monomer, the polymerization of which is to be initiated by ultraviolet light, and suppresses display unevenness generated along the outer edge of the display area in the step of curing the sealing material. The term "absorption wavelength edge" herein means a wavelength at an edge of the absorption wavelength range of a monomer. Specifically, it means a wavelength at which the absorbance (absorbance/cm) is 0.01 or lower, where the absorbance is measured with a diluted solution of a target monomer in chloroform at a concentration of $1.4 \times 10^{-4}$ mol/L and light with an optical path length of 10 mm. The absorption wavelength edge of a monomer can be determined by using a UV-VIS absorption spectrum measurement device V7100 (manufactured by JASCO Corp.), for example.

The reason why the light whose wavelength is 40 nm or more longer than the absorption wavelength edge of the monomer is applied in the first manufacturing method of the present invention is that light having a wavelength of the absorption wavelength edge of the monomer or light having a wavelength slightly longer than the absorption wavelength edge may promote polymerization. This will be specifically described in the evaluation test to be mentioned later.

The second manufacturing method of the present invention includes the steps of: dropping a liquid crystal composition containing a liquid crystal material and a monomer on one substrate of the pair of substrates; and curing a sealing material applied to one substrate of the pair of substrates along an outer edge thereof by heating without light irradiation. Application of heat suppresses the polymerization of the monomer, the polymerization of which is to be initiated by light, and suppresses display unevenness generated along the outer edge of the display area in the step of curing the sealing material. The second manufacturing method of the present invention requires a PS monomer which is not sufficiently polymerized by heat.

In the first and second manufacturing methods of the present invention, the liquid crystal layer is formed between the pair of substrates by a liquid crystal dropping (ODF) method. Thus, only bonding the pair of substrates as the following step leads to completion of filling the liquid crystal material. Unlike the vacuum injection method to be mentioned later, the ODF method requires no inlet for filling the liquid crystal material.

The third manufacturing method of the present invention includes the steps of: applying a sealing material onto one substrate of the pair of substrates along an outer edge thereof; bonding the pair of substrates; curing the sealing material; and vacuum-injecting a liquid crystal composition containing a liquid crystal material and a monomer into between the pair of substrates. In other words, in the third manufacturing method of the present invention, the liquid crystal material is filled into between the pair of substrates by a vacuum injection method. The method is preferably a dip method. The dip method is a method in which a pair of substrates bonded by using a sealing material is placed on a dish filled with a liquid crystal material in vacuo, and then the pressure is adjusted to an atmospheric pressure, so that the liquid crystal material is filled into between the pair of substrates owing to the difference between the inner and outer pressures and a capillary phenomenon. Thereby, the liquid crystal material can be filled after the components of the liquid crystal display panel are assembled except the liquid crystal layer, and disadvantageous proceeding of the PS step does not naturally occur by light irradiation for the purpose of curing the sealing material.

The fourth manufacturing method of the present invention includes the steps of: dropping a liquid crystal composition containing a liquid crystal material and a monomer on one substrate of the pair of substrates, the monomer being contained in an amount of 0.4% by weight or less in the whole liquid crystal composition; and curing a sealing material applied to one substrate of the pair of substrates along an outer edge thereof by irradiating the sealing material with light whose wavelength is 10 nm or more longer than the absorption wavelength edge of the monomer while shielding the display area from the light. In comparison with the first manufacturing method of the present invention, the concentration of the monomer in the liquid crystal composition is lower and the display area is shielded from light during light application. Thereby, the fourth manufacturing method suppresses display unevenness generated along the outer edge of the display area even though the sealing material is cured by light having a shorter wavelength. In this case, only one of reducing the monomer concentration and shielding the display area from light fails to give a sufficient effect. This manufacturing method shows secondary effects of increasing the degree of curing of the sealing material to improve the peeling strength and of shortening the cycle time because curing of the seal is finished with a low exposure dose.

The first to fourth manufacturing methods of the present invention each include the step of forming a polymer layer that controls the alignment of liquid crystal molecules adjacent thereto on the horizontal alignment film by irradiating the liquid crystal composition sealed between the pair of substrates with light to polymerize the monomer. Since the aforementioned structures suppress the polymerization of the monomer, which is initiated by light irradiation during the step of curing the sealing material, a polymer layer is formed without display unevenness.

The polymer layer is formed by polymerization of a monomer contained in the liquid crystal composition, and it controls the alignment of the liquid crystal molecules adjacent to the polymer layer. The monomer starts to polymerize by light irradiation, thereby forming a polymer layer. The polymerizable functional group of the monomer is preferably an acrylate group, a methacrylate group, a vinyl group, or a vinyloxy group. Particularly preferred is an acrylate group or a methacrylate group. An acrylate group and a methacrylate group generate radicals with high probability, and thus are effective for shortening the cycle time in production. The monomer preferably has two or more polymerizable functional groups. The more the number of polymerizable functional groups is, the higher the reaction efficiency is. Thereby, photopolymerization is achieved in a shorter time. If the monomer has too many polymerizable functional groups, the molecular weight becomes so high that the monomer is less likely to dissolve in the liquid crystal. Thus, the number of polymerizable functional groups in the monomer is more preferably four or less.

The PS layer may be formed by any polymerization in the present invention, and examples of the polymerization include "step-growth polymerization" where bifunctional monomers form new bonds so that the molecular weight increases stepwise, and "chain polymerization" where monomers bind to active species generated from a small amount of a catalyst (initiator) one after another so that the polymer sequentially grows. Examples of the step-growth polymerization include polycondensation and polyaddition. Examples of the chain polymerization include radical polymerization and ionic polymerization (e.g. anionic polymerization, cationic polymerization).

With a horizontal alignment film which is a photo-alignment film, light for forming a PS layer, in other words, light used in the step of forming a polymer layer that controls the alignment of liquid crystal molecules adjacent thereto on the horizontal alignment film by polymerizing the monomer, is preferably linearly polarized light. This is presumably because the light for curing the sealing material affects the photo-alignment film, deteriorating the alignment performance of the film. Use of linearly polarized light for forming a PS layer after the step of curing a sealing material improves the alignment performance of the liquid crystal adjacent to both of the photo-alignment film and the polymer layer, resulting in improvement of the contrast ratio.

The polymer layer formed on a horizontal alignment film improves the alignment-regulating force of the horizontal alignment film. This greatly suppresses image sticking and highly improves the display quality. In the case where a voltage equal to or higher than the threshold value is applied to the liquid crystal layer formed by the liquid crystal composition and the monomer is polymerized while the liquid crystal molecules are aligned with pre-tilt angle to form a polymer layer, the resulting polymer layer is formed in a state of having a structure to align the liquid crystal molecules with pre-tilt angle.

The electrode is preferably a transparent electrode. Examples of such an electrode material include transparent materials such as indium tin oxide (ITO) and indium zinc oxide (IZO). This is because as follows. In the case where one of a pair of substrates includes a color filter, light for polymerizing a monomer is required to be applied from the side of the substrate including no color filter. If the electrode of the substrate with no color filter blocks light, the monomer is insufficiently polymerized.

The liquid crystal composition preferably contains liquid crystal molecules including a multiple bond other than conjugated double bonds of a benzene ring in a molecular structure thereof. A functional group including a multiple bond, such as an alkenyl group, in the molecular structure of the liquid crystal material more accelerates the PS step. This is presumably because, first, the multiple bond of each liquid crystal molecule itself can be activated by light, and second, the multiple bond can serve as a transporter (carrier) which is capable of delivering the activation energy, radicals, or the like. In other words, not only the use of a photoactive material for a horizontal alignment film but also the use of a liquid crystal which is photoactive or which serves as a transporter (carrier) for delivering radicals or the like further increase the rates of the reaction of a polymerizable monomer and of formation of a PS layer, thereby providing a stable PS layer. The liquid crystal molecules may be those having positive anisotropy of dielectric constant (positive liquid crystal molecules) or may be those having negative anisotropy of dielectric constant (negative liquid crystal molecules). The liquid crystal molecules are preferably nematic liquid crystal molecules having high symmetry in the liquid crystal layer. Examples of the molecular skeleton of the liquid crystal molecules include a structure including two rings and a group linearly bonding to the ring. The multiple bond excludes the conjugated double bonds of a benzene ring. This is because the benzene ring is poor in reactivity. The liquid crystal molecules may include the conjugated double bonds of a benzene ring as long as it essentially includes a multiple bond other than the conjugated double bonds of a benzene ring. Such bonds are not especially excluded. The liquid crystal composition may be a mixture of multiple compositions. The liquid crystal composition may be a mixture of multiple kinds of liquid crystal molecules in order to secure the reliability, to improve the response rate, and to adjust the temperature range of the liquid crystal phase, the elastic constant, the anisotropy of dielectric constant, and the refractive index anisotropy.

The multiple bond is preferably a double bond, and preferably is present in an ester group or an alkenyl group. For the multiple bonds, a double bond has better reactivity than a triple bond. The multiple bond may be a triple bond; if this is the case, the triple bond preferably is present in a cyano group. Further, the liquid crystal molecules preferably include two or more kinds of multiple bonds.

The liquid crystal molecules preferably include at least one molecular structure selected from the group consisting of the structures represented by the following formulae (1-1) to (1-6). The liquid crystal molecules particularly preferably include the molecular structure represented by the following formula (1-4).

[Chem. 1]

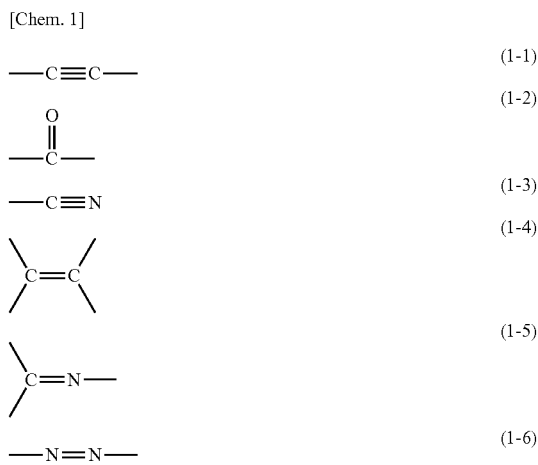

Advantageous Effects of Invention

The present invention suppresses polymerization of a monomer in a liquid crystal composition due to curing of a sealing material, and thus provides a liquid crystal display device which suffers no display unevenness along the por-

DESCRIPTION OF EMBODIMENTS

The following will describe the method for manufacturing a liquid crystal display device of the present invention referring to, but not limited to, examples with reference to the drawings.

First described is a general structure of a liquid crystal display device produced by a method for manufacturing a liquid crystal display device of any of Examples 1 to 12.

The liquid crystal display device produced by the method for manufacturing a liquid crystal display device of any of Examples 1 to 12 is a display device including a liquid crystal cell. Such a liquid crystal display device is suitably used for TV panels, digital signage, medical monitors, electronic books, PC monitors, display panels for tablet devices, display panels for mobile phones, and the like.

Figure 1:
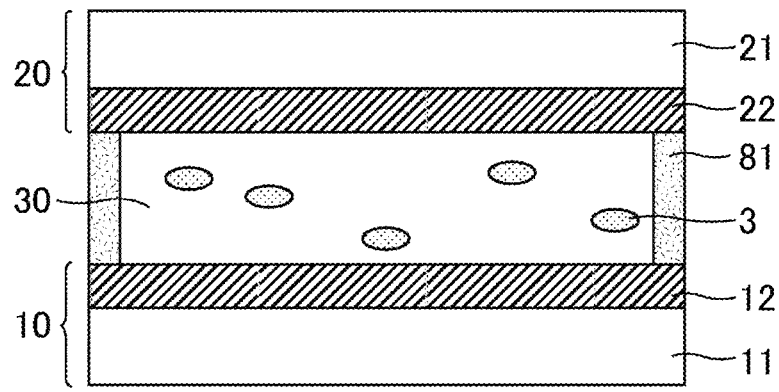
FIG. 1 is a schematic cross-sectional view showing a liquid crystal display device produced by a method for manufacturing a liquid crystal display device of any of Examples 1 to 12, before a PS polymerization step.
Figure 2:
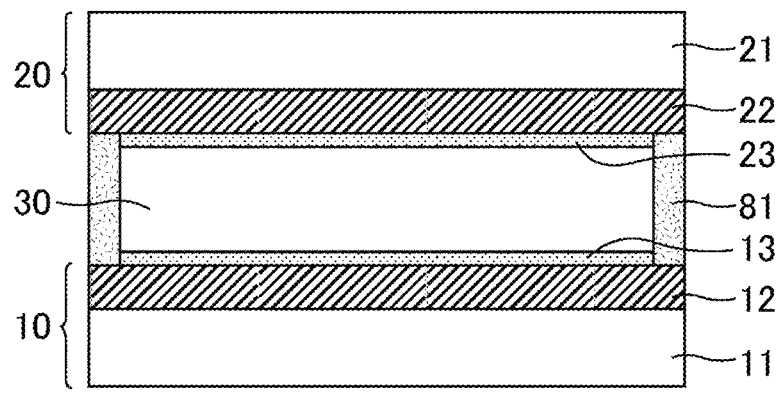
FIG. 2 is a schematic cross-sectional view showing a liquid crystal display device produced by a method for manufacturing a liquid crystal display device of any of Examples 1 to 12, after a PS polymerization step.

FIG. 1 and FIG. 2 each are a schematic cross-sectional view showing a liquid crystal display device produced by a method for manufacturing a liquid crystal display device of any of Examples 1 to 12. FIG. 1 shows the state before a PS polymerization step, whereas FIG. 2 shows the state after a PS polymerization step. The liquid crystal display device includes an array substrate 10, a color filter substrate 20, and a liquid crystal layer 30 interposed between a pair of substrates (i.e. the array substrate 10 and the color filter substrate 20). The array substrate 10 includes an insulating transparent substrate 11 formed from glass, for example, and further includes various components such as wiring, pixel electrodes, a common electrode, and TFTs disposed on the transparent substrate 11. The color filter substrate 20 includes an insulating transparent substrate 21 formed from glass, for example, and further includes various components such as a color filter and a black matrix disposed on the transparent substrate 21. In the case of the IPS mode, for example, electrodes are formed only on the array substrate 10. In the case of other modes, electrodes may optionally be formed on both of the array substrate 10 and the color filter substrate 20.

The array substrate 10 includes a horizontal alignment film 12, and the color filter substrate 20 also includes a horizontal alignment film 22. The horizontal alignment films 12 and 22 each are a film mainly containing such components as polyimide, polyamide, polyvinyl, and polysiloxane. The horizontal alignment films align the liquid crystal molecules adjacent thereto substantially horizontally to the surfaces of the horizontal alignment films. The horizontal alignment films 12 and 22 each contain a photoactive material which is, for example, a material including a compound containing the aforementioned photoactive functional group.

As shown in FIG. 1, the liquid crystal layer 30 before the PS polymerization step includes a polymerizable monomer 3 therein. The PS polymerization step initiates polymerization of the polymerizable monomer 3. As shown in FIG. 2, the monomer is then formed into PS layers 13 and 23 on the horizontal alignment films 12 and 22, respectively, thereby improving the alignment-regulating force of the horizontal alignment films 12 and 22. The polymerizable monomer 3 may be a mixture of multiple monomers.

The PS layers 13 and 23 may be formed by filling a liquid crystal composition containing a liquid crystal material and a polymerizable monomer into between the array substrate 10 and the color filter substrate 20; irradiating the liquid crystal layer 30 with a certain amount of light; and thereby polymerizing the polymerizable monomer 3. Polymerization while applying a voltage equal to or higher than the threshold value to the liquid crystal layer 30 forms PS layers 13 and 23 each having a shape along the initial inclination of the liquid crystal molecules. In other words, the PS layers 13 and 23 formed have higher alignment stability. The liquid crystal composition may optionally contain a polymerization initiator.

The polymerizable monomer 3 to be used in Examples 1 to 12 may be a monomer including a monofunctional or polyfunctional polymerizable group containing a ring structure or a mixture of such monomers. Examples of such a monomer include a compound of the chemical formula (2):

[Chem. 2]

(2)

in the formula, $R^1$ represents a —$R^2$-$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a C1 to C12 linear or branched alkyl group;

$P^1$ represents a polymerizable group;

Sp¹ represents a C1 to C6 linear, branched, or cyclic alkylene or alkyleneoxy group, or a direct bond;

a hydrogen atom in R¹ may be substituted with a fluorine atom or a chlorine atom;

a —CH₂— group in R¹ may be substituted with an —O— group, an —S— group, an —NH— group, a —CO— group, a —COO— group, an —OCO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —CC— group, a —CH=CH—COO— group, or an —OCO—CH=CH— group as long as an oxygen atom and a sulfur atom are not adjacent to each other;

R² represents an —O— group, an —S— group, an —NH— group, a —CO— group, a —COO— group, an —OCO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —CC— group, a —CH=CH—COO— group, an —OCO—CH=CH— group, or a direct bond;

A¹ and A² are the same as or different from each other, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

—CH₂— groups in A¹ and A² each may be substituted with an —O— group or an —S— group as long as they are not adjacent to each other;

hydrogen atoms in A¹ and A² each may be substituted with a fluorine atom, a chlorine atom, a —CN group, or a C1 to C6 alkyl, alkoxy, alkylcarbonyl, alkoxycarbonyl, or alkylcarbonyloxy group;

Zs are the same as or different from each other, and each represents an —O— group, an —S— group, an —NH— group, a —CO— group, a —COO— group, an —COO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —CC— group, a —CH=CH—COO— group, an —OCO—CH=CH— group, or a direct bond; and n is 0, 1, or 2.

More specific examples thereof include any of compounds represented by the following chemical formulae (3-1) to (3-5):

[Chem. 3]

(3-1)

(3-2)

(3-3)

(3-4)

(3-5)

in each formula, P¹s are the same as or different from each other, and each represents a polymerizable group; part or all of hydrogen atoms of the benzene rings may be substituted with a halogen atom or a C1 to C12 alkyl or alkoxy group; and part or all of hydrogen atoms of the C1 to C12 alkyl or alkoxy group may be substituted with a halogen atom.

The monomers represented by the chemical formulae (3-1) to (3-5) are compounds that are photocleavable by ultraviolet light irradiation to generate radicals, and thus the polymerization thereof proceeds without a polymerization initiator. As a result, such monomers suppress deterioration of display quality, such as image sticking, due to remaining of a polymerization initiator after completion of the PS step.

Examples of P¹ include an acryloyloxy group, a methacryloyloxy group, a vinyl group, a vinyloxy group, an acryloylamino group, and a methacryloylamino group.

The polymerizable monomer 3 to be used in Examples 1 to 12 may be any of compounds represented by the following chemical formulae (4-1) to (4-8):

[Chem. 4]

(4-1)

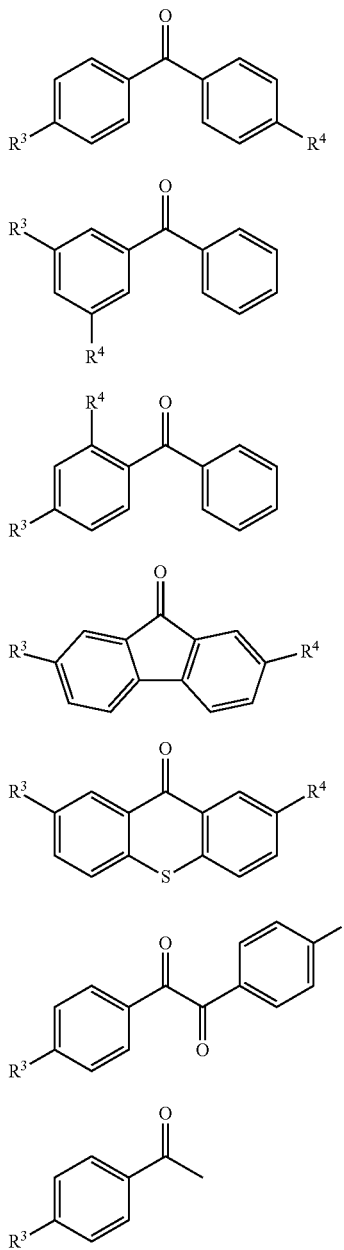

in each formula, $R^3$ and $R^4$ are the same as or different from each other, and each represents an -$Sp^2$-$P^2$ group, a hydrogen atom, a halogen, a —CN group, an —$NO_2$ group, an —NCO group, an —NCS group, an —OCN group, an —SCN group, an —$SF_5$ group, or a C1 to C12 linear or branched alkyl, aralkyl, or phenyl group, at least one of $R^3$ and $R^4$ includes an -$Sp^2$-$P^2$ group;

$P^2$ represents a polymerizable group;

$Sp^2$ represents a C1 to C6 linear, branched, or cyclic alkylene or alkyleneoxy group, or a direct bond;

provided that at least one of $R^3$ and $R^4$ represents a C1 to C12 linear or branched alkyl, aralkyl, or phenyl group, a hydrogen atom in the at least one of $R^3$ and $R^4$ may be substituted with a fluorine atom, a chlorine atom, or an -$Sp^2$-$P^2$ group;

a —$CH_2$— group in $R^1$ and $R^2$ may be substituted with an —O— group, an —S— group, an —NH— group, a —CO— group, a —COO— group, an —COO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$-group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —CC— group, a —CH=CH—COO— group, or an —OCO—CH=CH— group as long as an oxygen atom, a sulfur atom, and a nitrogen atom are not adjacent to each other;

part or all of hydrogen atoms of the benzene rings may be substituted with a halogen atom or a C1 to C12 alkyl or alkoxy group; part or all of hydrogen atoms of the C1 to C12 alkyl or alkoxy group may be substituted with a halogen atom.

Examples of $P^2$ include an acryloyloxy group, a methacryloyloxy group, a vinyl group, a vinyloxy group, an acryloylamino group, and a methacryloylamino group.

The compounds represented by the chemical formulae (4-1) to (4-8) are compounds that generate radicals by visible light irradiation and the resulting hydrogen abstraction, and thus the polymerization thereof proceeds without a polymerization initiator. As a result, such compounds suppress deterioration of display quality, such as image sticking, due to remaining of a polymerization initiator even after completion of the PS step.

A sealing material 81 is disposed between the array substrate 10 and the color filter substrate 20 along an outer edge of these substrates. The sealing material 81 may be a resin curable by light or heat, for example. The liquid crystal layer 30 is formed by bonding the array substrate 10 and the color filter substrate 20 with the sealing material 81 such that the liquid crystal composition is contained between the substrates. Since the PS step is performed after bonding by the sealing material, the sealing material 81 is formed on the horizontal alignment films 12 and 22, while the PS layers 13 and 23 are formed in a region surrounded by the sealing material 81 as shown in FIG. 2.

In the liquid crystal display device, the array substrate 10, the liquid crystal layer 30, and the color filter substrate 20 are laminated in the stated order from the back side to the viewing side of the liquid crystal display device, thereby forming a liquid crystal cell. The back side of the array substrate 10 and the viewing side of the color filter substrate 20 each are provided with a linearly polarizing plate. Each of these linearly polarizing plates may further be provided with a retarder to form a circularly polarizing plate.

The liquid crystal display device may be of a transmissive type, a reflective type, or a transflective type. Transmissive or transflective liquid crystal display devices further include a backlight. The backlight is disposed on the back side of the liquid crystal cell, and the light emitted therefrom passes through the array substrate 10, the liquid crystal layer 30, and the color filter substrate 20 in the stated order. The array substrate 10 of a reflective or transflective liquid crystal display device includes a reflector for reflecting outside light. The polarizing plate on the color filter substrate 20 needs to be a circularly polarizing plate at least in a region utilizing reflected light for display.

The liquid crystal display device may be of a color filter on array (COA) type where a color filter is formed on an array substrate or of a black matrix on array (BOA) type where a black matrix is formed on an array substrate. The display device may be a monochrome display or a field sequential color display. In these cases, no color filter is required.

The liquid crystal layer 30 is filled with a liquid crystal material that has a characteristic of aligning in a specific direction in response to a certain voltage. The alignment characteristic of the liquid crystal molecules in the liquid crystal layer 30 is controlled by application of a voltage equal to or higher than the threshold value.

The sealing material component, the alignment film component, the monomer component in the PS layer, and the like may be analyzed by disassembling the liquid crystal display device and performing chemical analysis utilizing, for example, gas chromatograph mass spectrometry (GC-MS) or time-of-flight secondary ion mass spectrometry (TOF-SIMS). Further, microscopic observation using, for example, a scanning transmission electron microscope (STEM) or a scanning electron microscope (SEM) may show the cross section of the liquid crystal cell including the alignment film and the PS layer. In the case of filling the liquid crystal by a vacuum injection method, the seal has a pattern of an inlet.

The following will describe the methods for manufacturing a liquid crystal display device of Examples 1 to 12 where liquid crystal displays were actually manufactured.

Example 1

Figure 3:
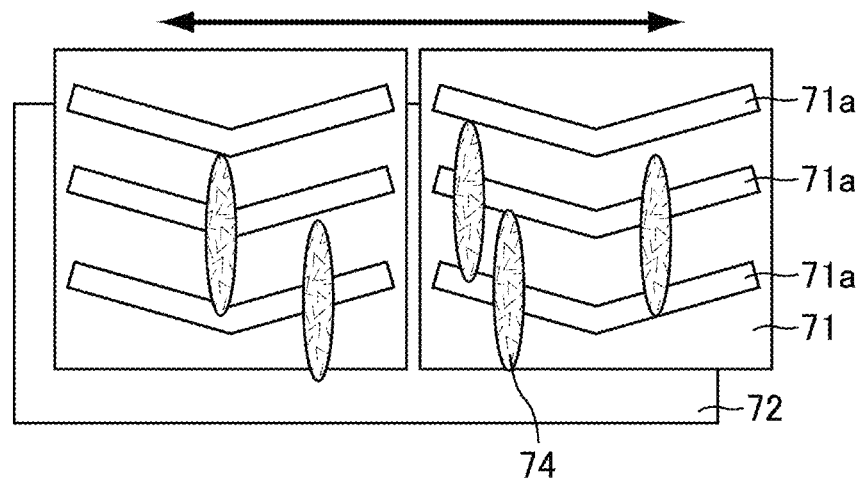
FIG. 3 is a schematic plan view showing a substrate provided with slitted electrodes of Example 1.

Example 1 is an example of producing a liquid crystal cell of the FFS mode. Further, Example 1 corresponds to the first manufacturing method of the present invention. A TFT substrate (FFS substrate) provided with slitted electrodes and a plate-like electrode (plate electrode) and a counter substrate provided with a color filter were prepared, and a polyvinyl cinnamate solution as a material for a horizontal alignment film was applied on each substrate by a spin-coating method. The size of the TFT substrate was 10 inches. One of the slitted electrode and the plate electrode served as a signal electrode, and the other served as a common electrode. FIG. 3 is a schematic plan view showing a substrate provided with slitted electrodes of Example 1. The double-headed arrow in FIG. 3 indicates the polarization direction of light applied (in the case of using negative liquid crystal molecules). The materials of the slitted electrodes 71 and the plate electrode 72 each were a transparent material. Each slit 71a of the slitted electrodes had a V shape; the width L of each slit 71a of the slitted electrodes was 3 μm; and the spacing S between slits 71a was 5 μm. The polyvinyl cinnamate solution was prepared by dissolving polyvinyl cinnamate in a solvent mixture of the same amounts of N-methyl-2-pyrrolidone and ethylene glycol monobutyl ether such that the amount of the polyvinyl cinnamate in the whole solution was 3% by weight.

The applied materials by a spin-coating method were pre-dried at 100° C. for one minute, and then baked at 220° C. for 40 minutes under nitrogen purge. The baked alignment film on the slitted electrodes at the display area (active area) of the TFT substrate had a thickness of 75 nm. The baked alignment film at the display area (active area) of the color filter substrate was 85 nm.

Then, photo spacers were formed on the counter substrate to adjust the thickness of the liquid crystal layer at the display area (active area) to 3.5 μm. The bottom diameter of the photo spacer was 12 μm. The bottom diameter herein is defined by the diameter of the portion in contact with the layer just below the alignment film.

Next, with respect to the alignment treatment, the surfaces of the substrates were irradiated with linearly polarized ultraviolet light from the normal direction of the substrates so as to give a dose of 5 J/cm$^2$ at a wavelength of 313 nm. The degree of polarization of the linearly polarized light was 30:1. As shown in FIG. 3, the angle between the longitudinal direction of the slitted electrode and the polarization direction was 10°. Thereby, the liquid crystal molecules 74 are aligned in the direction substantially orthogonal to the polarization direction of the linearly polarized ultraviolet light when no voltage is applied, while they are aligned in the direction substantially orthogonal to the longitudinal direction of the slitted electrode when a voltage equal to or higher than the threshold value is applied.

Next, a heat- and visible-light-curable sealing material (WORLD ROCK, manufactured by Kyoritsu Chemical & Co., Ltd.) was applied on the TFT substrate along its outer edge by using a dispenser.

A liquid crystal composition containing a liquid crystal material and a monomer was dropped on the counter substrate. The liquid crystal composition was prepared by adding trans-4-propyl-4'-vinyl-1,1'-bicyclohexane as a liquid crystalline molecule including an alkenyl group (5% by weight in the whole of the liquid crystal composition) and biphenyl-4,4'-diylbis(2-methyl acrylate) represented by the following chemical formula (5) as a monomer (1.0% by weight in the whole of the liquid crystal composition) to MLC-6610 (manufactured by Merck KGaA). The monomer represented by the following chemical formula (5) is a compound which has an absorption wavelength edge of 325 nm and which is insufficiently polymerized by light whose wavelength is 365 nm or longer or by heat.

[Chem. 5]

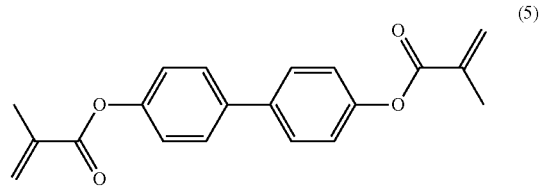

(5)

The two substrates were bonded such that the polarization directions of the ultraviolet light irradiating the respective substrates corresponded to each other.

The seal was cured by using an ultra-high-pressure UV lamp (USH-500D, manufactured by USHIO INC.) while pressing the bonded substrates at 0.5 kgf/cm$^2$. A filter for shielding light having a wavelength of 380 nm or shorter was disposed between the bonded substrates and the ultra-high-pressure UV lamp, so that the substrates were not irradiated with ultraviolet light.

The workpiece was heated at 130° C. for 40 minutes under pressure to thermal-cure the seal, and to make the liquid crystal molecules have an isotropic phase for realignment treatment. In order to prevent the alignment of the liquid crystal from being disturbed by an external field, the electrodes were short-circuited and the surface of the glass substrate was subjected to charge elimination.

This provided a liquid crystal cell with alignment orthogonal to the polarization direction of ultraviolet light irradiating the alignment film and uniaxial alignment in the plane of the substrate.

These steps were performed under a yellow fluorescent lamp, and the liquid crystal cell was shielded from the ultraviolet light emitted from the fluorescent lamp.

Immediately before the following PS treatment, the liquid crystal cell was heated at 130° C. for 40 minutes so that charge elimination was elaborately performed.

Next, the liquid crystal cell was irradiated with unpolarized ultraviolet light at a dose of 1.5 J/cm² by using a black light (FHF32BLB, manufactured by TOSHIBA CORP.) for the PS treatment. This proceeded the polymerization of biphenyl-4,4'-diylbis(2-methyl acrylate). Thereby, a liquid crystal cell of Example 1 was produced.

This liquid crystal cell and other parts were assembled into a liquid crystal display panel, and its display was visually observed. The observation revealed that the display was good without alignment unevenness and suffered less image sticking.

Example 2

A liquid crystal cell was produced in the same manner as in Example 1 except that a different monomer was used. Example 2 corresponds to the first manufacturing method of the present invention. Specifically, the liquid crystal composition was prepared by adding trans-4-propyl-4'-vinyl-1,1'-bicyclohexane as a liquid crystalline molecule including an alkenyl group (5% by weight in the whole of the liquid crystal composition) and phenanthrene-2,7-diylbis(2-methyl acrylate) represented by the following chemical formula (6) as a monomer (1.0% by weight in the whole of the liquid crystal composition) to MLC-6610 (manufactured by Merck KGaA). The monomer represented by the following chemical formula (6) is a compound which has an absorption wavelength edge of 360 nm and which is insufficiently polymerized by light whose wavelength is 405 nm or longer or by heat.

[Chem. 6]

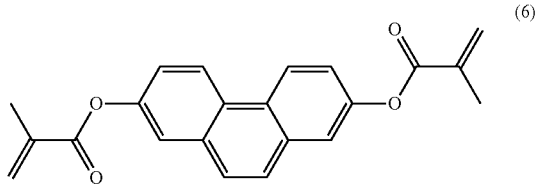

(6)

This liquid crystal cell and other parts were assembled into a liquid crystal display panel, and its display was visually observed. The observation revealed that the display was good without alignment unevenness and suffered less image sticking.

Figure 4:
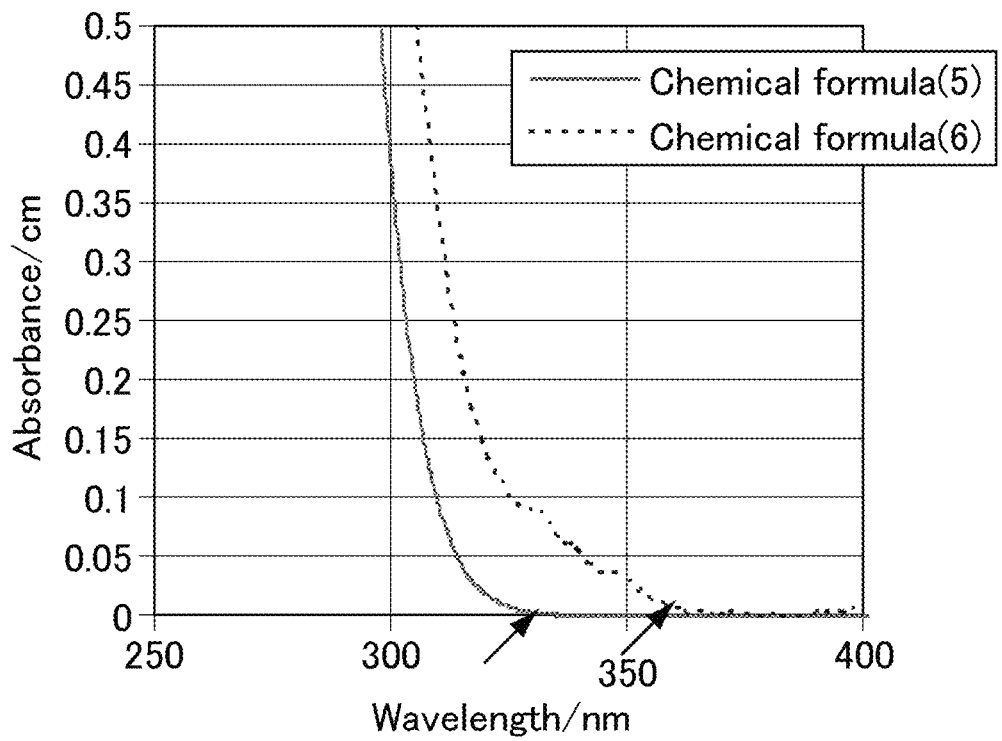
FIG. 4 is a graph showing the absorption spectra of the compound represented by the formula (5) below and the compound represented by the formula (6) below.

FIG. 4 is a graph showing the absorption spectra of the compound represented by the formula (5) and the compound represented by the formula (6). The spectra were measured by using a UV-VIS absorption spectrum measurement device V7100 (manufactured by JASCO Corp.).

Example 3

In Example 3, a liquid crystal cell was produced in the same manner as in Example 1 except that a thermosetting sealing material (HC1413FP, manufactured by Mitsui Chemicals, Inc.) was used as a sealing material and ultraviolet light was not applied from an ultra-high-pressure UV lamp for curing the sealing material. Example 3 corresponds to the second manufacturing method of the present invention. This liquid crystal cell and other parts were assembled into a liquid crystal display panel, and its display was visually observed. The observation revealed that the display was good without alignment unevenness and suffered less image sticking.

Comparative Example 1

A liquid crystal cell was assembled in the same manner as in Example 3 except that a heat- and ultraviolet-light-curable sealing material (Photolec S-WB, manufactured by SEKISUI CHEMICAL CO., LTD.) was used as a sealing material and ultraviolet light was applied by using an ultra-high-pressure UV lamp (USH-500D, manufactured by USHIO INC.) for curing the sealing material without disposing a filter for shielding light having a wavelength of 380 nm or shorter. Then, display of the liquid crystal cell was visually observed and the observation revealed that the display showed alignment unevenness throughout the display area.

Comparative Example 2

Figure 12:
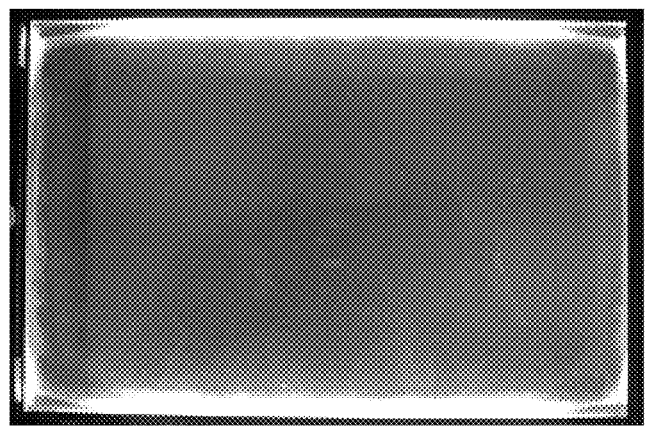
FIG. 12 is a photograph showing display unevenness at the periphery of the display area in a liquid crystal display panel.

The same procedure as in Comparative Example 1 was performed except that a chromium-plated silica glass was disposed so as to shield the display area from ultraviolet light upon curing the sealing material, and uneven alignment unevenness along the sealing material (the periphery of the display area) was observed as shown in FIG. 12.

Example 4

Example 4 is an example of producing a liquid crystal cell of the FFS mode. Example 4 corresponds to the third manufacturing method of the present invention. A TFT substrate (FFS substrate) provided with slitted electrodes and a plate-like electrode (plate electrode) and a counter substrate provided with a color filter were prepared, and a polyvinyl cinnamate solution as a material for a horizontal alignment film was applied on each substrate by a spin-coating method. The size of the TFT substrate was 10 inches. The materials of the slitted electrodes 71 and the plate electrode 72 each were a transparent material. Each slit 71a of the slitted electrodes had a V shape; the width L of each slit 71a of the slitted electrodes was 3 µm; and the spacing S between slits 71a was 5 µm. The polyvinyl cinnamate solution was prepared by dissolving polyvinyl cinnamate in a solvent mixture of the same amounts of N-methyl-2-pyrrolidone and ethylene glycol monobutyl ether such that the amount of the polyvinyl cinnamate in the whole solution was 3% by weight.

The applied materials by a spin-coating method were pre-dried at 100° C. for one minute, and then baked at 220° C. for 40 minutes under nitrogen purge. The baked alignment film on the slitted electrodes at the display area (active area) of the TFT substrate had a thickness of 75 nm. The baked alignment film at the display area (active area) of the color filter substrate was 85 nm.

Then, photo spacers were formed on the counter substrate to adjust the thickness of the liquid crystal layer at the display area (active area) to 3.5 µm. The bottom diameter of the photo spacer was 12 µm. The bottom diameter herein is defined by the diameter of the portion in contact with the layer just below the alignment film.

Next, with respect to the alignment treatment, the surfaces of the substrates were irradiated with linearly polarized ultraviolet light from the normal direction of the substrates so as to give a dose of 5 J/cm² at a wavelength of 313 nm. The angle between the longitudinal direction of the slitted electrode and the polarization direction was 10°.

Next, a heat- and ultraviolet-light-curable sealing material (Photolec S-WB, manufactured by SEKISUI CHEMICAL CO., LTD.) was applied on the TFT substrate along its outer edge by using a dispenser. The applying pattern was such that an inlet was partially formed so as to make it possible to inject the liquid crystal composition during the post-process.

The two substrates were bonded such that the polarization directions of the ultraviolet light irradiating the respective substrates corresponded to each other.

The seal was cured by using an ultra-high-pressure UV lamp (USH-500D, manufactured by USHIO INC.) while pressing the bonded substrates at 0.5 kgf/cm². The workpiece was heated at 130° C. for 40 minutes under pressure to further cure the seal.

Next, a liquid crystal composition containing a liquid crystal material and a monomer was filled into between the pair of substrates by a vacuum injection (dip) method. The liquid crystal composition was the same as in Example 1. After the liquid crystal composition was filled, the inlet of the cell was sealed with an epoxy-type adhesive (Araldite AR-S30, manufactured by NICHIBAN Co., Ltd.).

Next, in order to remove the flow alignment of the liquid crystal, a realignment treatment of heating The the workpiece at 130° C. for 40 minutes to make the liquid crystal molecules have an isotropic phase was performed. In order to prevent the alignment of the liquid crystal from being disturbed by an external field, the electrodes were short-circuited and the surfaces of the glass substrates were subjected to charge elimination.

This provided a liquid crystal cell with alignment orthogonal to the polarization direction of ultraviolet light irradiating the alignment film and uniaxial alignment in the plane of the substrate.

These steps were performed under a yellow fluorescent lamp, and the liquid crystal cell was shielded from the ultraviolet light emitted from the fluorescent lamp. Immediately before the following PS treatment, the liquid crystal cell was heated at 130° C. for 40 minutes so that charge elimination was elaborately performed.

Next, the liquid crystal cell was irradiated with ultraviolet light at a dose of 1.5 J/cm² by using a black light (FHF32BLB, manufactured by TOSHIBA CORP.) for the PS treatment. This proceeded the polymerization of biphenyl-4,4'-diylbis(2-methyl acrylate). Thereby, a liquid crystal cell of Example 4 was produced.

This liquid crystal cell and other parts were assembled into a liquid crystal display panel, and its display was visually observed. The observation revealed that the display was good without alignment unevenness and suffered less image sticking.

Comparative Example 3

A liquid crystal cell was assembled in the same manner as in Example 4 (that is, in the same manner as in Comparative Example 1) except that the liquid crystal was filled not by a vacuum injection method but by the liquid crystal dropping method. Then, display of the liquid crystal cell was visually observed and the observation revealed that the display showed alignment unevenness along the sealing material (the periphery of the display area) as shown in FIG. 12.

Example 5

In Example 5, a liquid crystal cell was produced in the same manner as in Example 1 except that a solution of polyimide including a cyclobutane skeleton was used as an alignment film material and the alignment treatment was performed in different conditions. The alignment film material was applied to the substrates and dried in the same conditions as in Example 1. With respect to the alignment treatment, the surfaces of the substrates were irradiated with linearly polarized ultraviolet light from the normal direction of the substrates so as to give a dose of 500 mJ/cm² at a wavelength of 254 nm. This led to photodissociation of the alignment film material applied on the substrates, thereby providing horizontal alignment films.

A display panel including the liquid crystal cell according to Example 5 was evaluated for its performance, resulting in no display unevenness around the seal, no increase in driving voltage, no decrease in contrast, and no marked deterioration in voltage holding ratio. Further, the display panel had a particularly improved effect against image sticking.

Evaluation Test 1

In order to examine the wavelength of light for curing the sealing material which affects the polymerization of the compound represented by the chemical formula (5) used as the monomer, the following liquid crystal cells of Reference Examples 1 to 4 were produced and examined.

Reference Example 1

A pair of bare glass substrates with no components such as electrodes was prepared, and a polyvinyl cinnamate solution as a material for horizontal alignment films was applied on each substrate by a spin-coating method. The polyvinyl cinnamate solution was prepared by dissolving polyvinyl cinnamate in a solvent mixture of the same amounts of N-methyl-2-pyrrolidone and ethylene glycol monobutyl ether such that the amount of the polyvinyl cinnamate in the whole solution was 3% by weight.

The applied materials by a spin-coating method were pre-dried at 90° C. for one minute, and then baked at 220° C. for 60 minutes under nitrogen purge. The baked alignment films each had a thickness of 100 nm.

Next, with respect to the alignment treatment, the surfaces of the substrates were irradiated with linearly polarized ultraviolet light from the normal direction of the substrates so as to give a dose of 5 J/cm² at a wavelength of 313 nm.

Next, a thermosetting sealing material (HC1413FP: manufactured by Mitsui Chemicals, Inc.) was applied on one substrate along the outer edge of the substrate by using a screen printing plate. The applying pattern was such that an inlet was partially formed so as to make it possible to inject the liquid crystal composition during the post-process.

Then, beads (SP-2035, manufactured by SEKISUI CHEMICAL CO., LTD.) having a diameter of 3.5 µm were dispersed on one substrate to adjust the thickness of the liquid crystal layer to 3.5 µm. The two substrates were bonded such that the polarization directions of the ultraviolet light irradiating the respective substrates corresponded to each other.

The seal was cured by using an ultra-high-pressure UV lamp (USH-500D, manufactured by USHIO INC.) while pressing the bonded substrates at 0.5 kgf/cm². The workpiece was heated at 130° C. for 60 minutes under pressure to further cure the seal.

Next, a liquid crystal composition containing a liquid crystal material and a monomer was filled into between the pair of substrates by a vacuum injection method. The liquid crystal composition was prepared by adding trans-4-propyl-4'-vinyl-1,1'-bicyclohexane as a liquid crystalline molecule (5% by weight in the whole of the liquid crystal composition) and biphenyl-4,4'-diylbis(2-methyl acrylate) as a monomer (0.3% by weight in the whole of the liquid crystal composition) to MLC-6610 (manufactured by Merck KGaA). After the liquid crystal composition was filled, the inlet of the cell was sealed with an epoxy-type adhesive (Araldite AR-S30, manufactured by NICHIBAN Co., Ltd.).

In order to prevent the alignment of the liquid crystal from being disturbed by an external field, the electrodes were short-circuited and the surfaces of the glass substrates were subjected to charge elimination. At this time, the liquid crystal molecules were flow-aligned.

Next, the whole liquid crystal cell was irradiated with light at a dose of 2 $J/cm^2$ from an ultra-high-pressure UV lamp (USH-500D, manufactured by USHIO INC.) as a light source through a 340-nm band-pass filter.

A realignment treatment of heating the liquid crystal cell of Reference Example 1 thus produced at 130° C. for 40 minutes was performed. As a result, the PS polymerization proceeded in the liquid crystal composition to immobilize the alignment of the liquid crystal, and the liquid crystal held the flow alignment.

Reference Example 2

A liquid crystal cell of Reference Example 2 was produced by the same method as in Reference Example 1 except that the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 360-nm band-pass filter. A realignment treatment of heating this liquid crystal cell at 130° C. for 40 minutes was performed. As a result, the PS polymerization proceeded in the liquid crystal composition to immobilize the alignment of the liquid crystal, and the liquid crystal held the flow alignment.

Reference Example 3

A liquid crystal cell of Reference Example 3 was produced by the same method as in Reference Example 1 except that the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 365-nm band-pass filter. A realignment treatment of heating this liquid crystal cell at 130° C. for 40 minutes was performed. As a result, the flow alignment of the liquid crystal was removed and the liquid crystal was uniaxially aligned without unevenness.

Reference Example 4

A liquid crystal cell of Reference Example 4 was produced by the same method as in Reference Example 1 except that the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 370-nm band-pass filter. A realignment treatment of heating this liquid crystal cell at 130° C. for 40 minutes was performed. As a result, the flow alignment of the liquid crystal was removed and the liquid crystal was uniaxially aligned without unevenness.

Consequently, shielding of light having a wavelength of at least shorter than 365 nm makes it possible to suppress the polymerization of the monomer represented by the chemical formula (5) at the same time of curing the sealing material.

Evaluation Test 2

In order to examine the wavelength of light for curing the sealing material which affects the polymerization of the compound represented by the chemical formula (6) used as the monomer, the following liquid crystal cells of Reference Examples 5 to 8 were produced and examined.

Reference Example 5

A liquid crystal cell of Reference Example 5 was produced by the same method as in Reference Example 1 except that the compound represented by the chemical formula (6) was used as the monomer and the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 380-nm band-pass filter. A realignment treatment of heating this liquid crystal cell at 130° C. for 40 minutes was performed. As a result, the PS polymerization proceeded in the liquid crystal composition to immobilize the alignment of the liquid crystal, and the liquid crystal held the flow alignment.

Reference Example 6

A liquid crystal cell of Reference Example 6 was produced by the same method as in Reference Example 5 except that the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 390-nm band-pass filter. A realignment treatment of heating this liquid crystal cell at 130° C. for 40 minutes was performed. As a result, the PS polymerization proceeded in the liquid crystal composition to immobilize the alignment of the liquid crystal, and the liquid crystal held the flow alignment.

Reference Example 7

A liquid crystal cell of Reference Example 7 was produced by the same method as in Reference Example 5 except that the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 400-nm band-pass filter. A realignment treatment of heating this liquid crystal cell at 130° C. for 40 minutes was performed. As a result, the flow alignment of the liquid crystal was removed and the liquid crystal was uniaxially aligned without unevenness.

Reference Example 8

A liquid crystal cell of Reference Example 8 was produced by the same method as in Reference Example 5 except that the whole liquid crystal cell was subjected to the PS step such that it was irradiated with light at a dose of 2 $J/cm^2$ from an ultra-high-pressure UV lamp (USH-500D, manufactured by USHIO INC.) as a light source through a 420-nm band-pass filter. A realignment treatment of heating this liquid crystal cell at 130° C. for 40 minutes was performed. As a result, the flow alignment of the liquid crystal was removed and the liquid crystal was uniaxially aligned without unevenness.

Consequently, shielding of light having a wavelength of at least shorter than 400 nm makes it possible to suppress the polymerization of the monomer represented by the chemical formula (6) at the same time of curing the sealing material.

Figure 5:
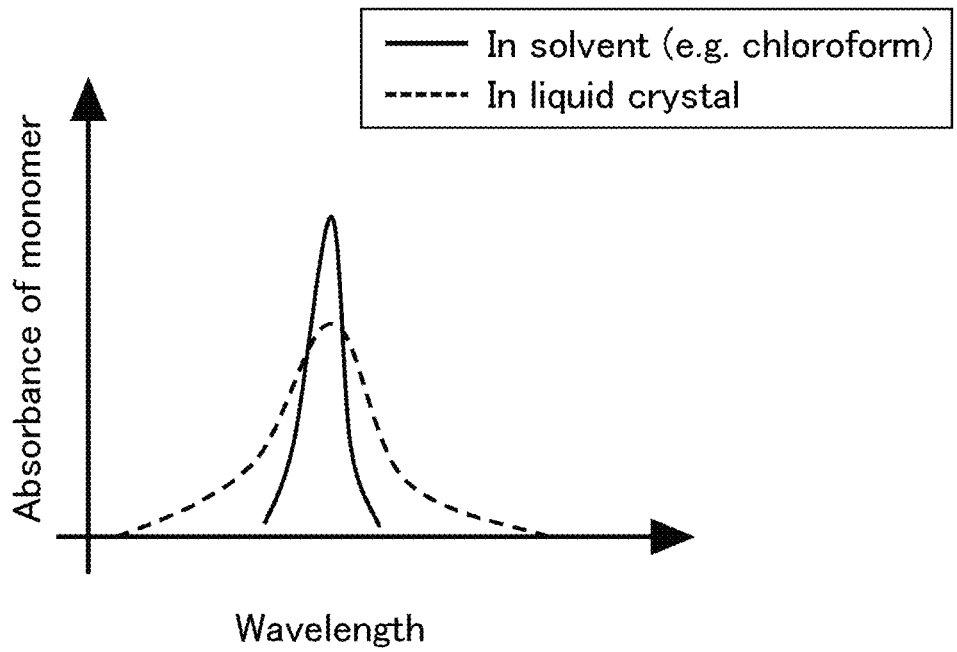
FIG. 5 is a graph showing that an absorption wavelength of a monomer dissolved in a liquid crystal differs from that of a monomer dissolved in a solvent such as chloroform.
Figure 6:
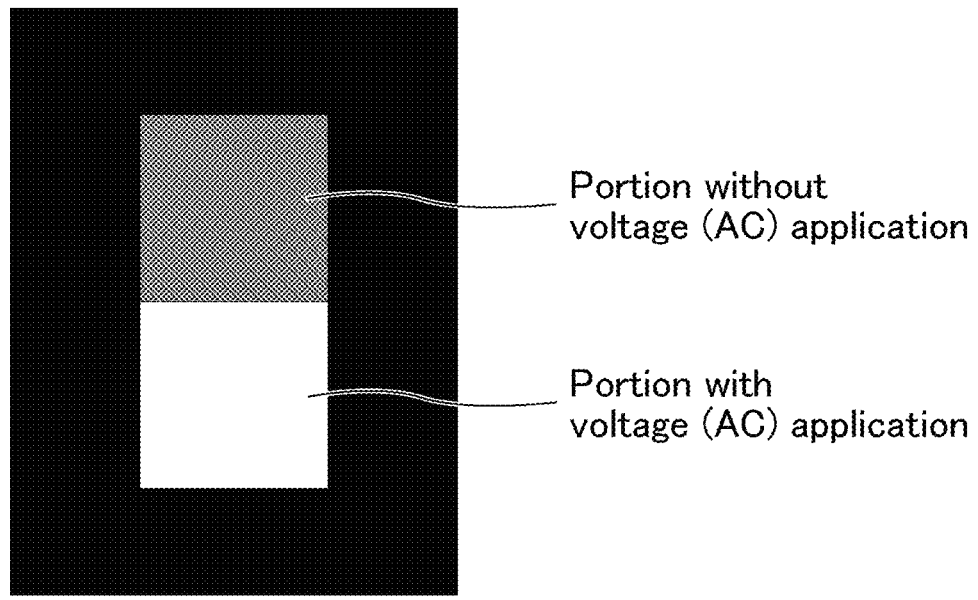
FIG. 6 is a schematic view showing the state of image sticking in a liquid crystal cell of an IPS mode produced with photo-alignment treatment.
Figure 7:
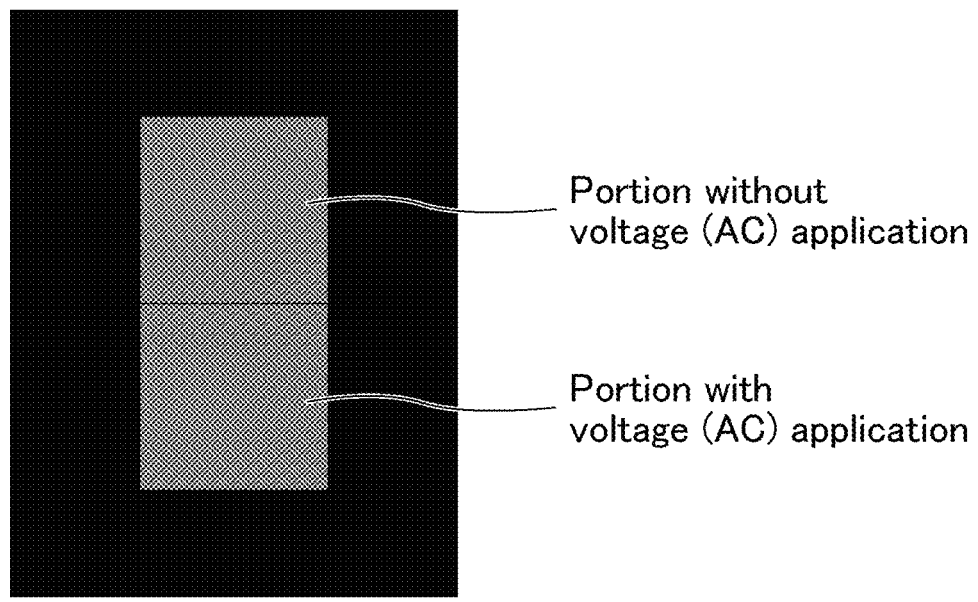
FIG. 7 is a schematic view showing the state of image sticking in a liquid crystal cell of an IPS mode produced with photo-alignment treatment and a PS step.
Figure 8:
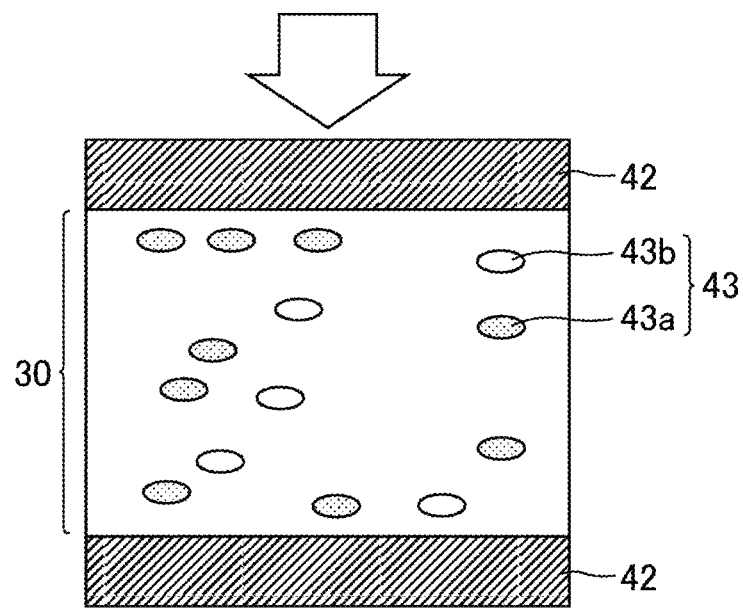
FIG. 8 is a schematic view showing for comparison the state of polymerization of a polymerizable monomer when an alignment film formed from a photoinactive material is subjected to a PS step.
Figure 9:
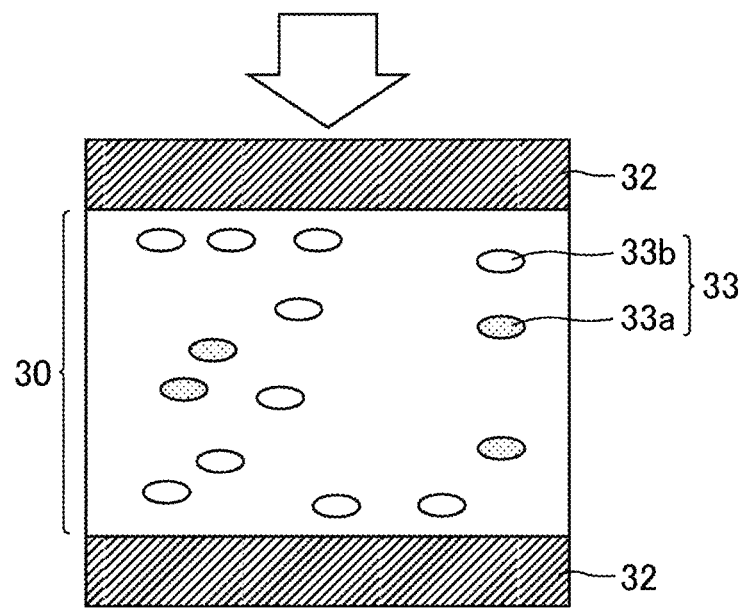
FIG. 9 is a schematic view showing for comparison the state of polymerization of a polymerizable monomer when an alignment film formed from a photoactive material is subjected to a PS step.
Figure 10:
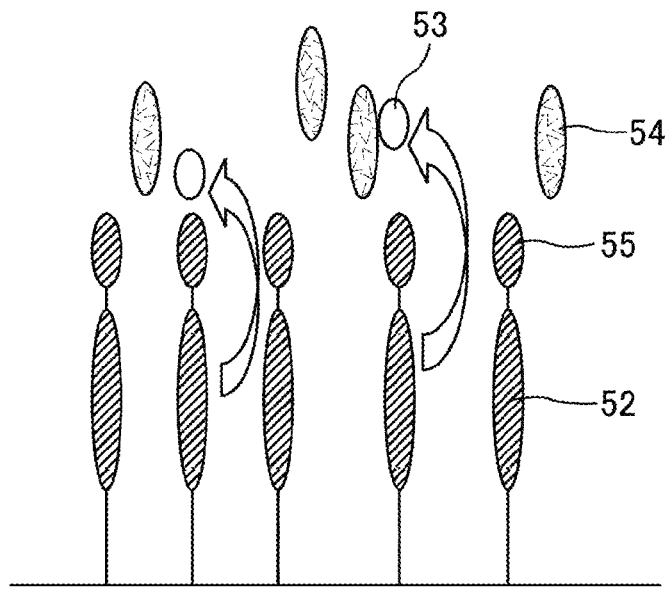
FIG. 10 is a schematic view showing the state of polymerizing a polymerizable monomer onto a vertical alignment film.
Figure 11:
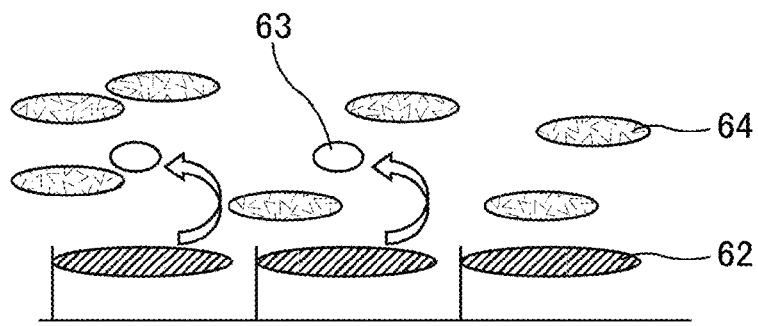
FIG. 11 is a schematic view showing the state of polymerizing a polymerizable monomer onto a horizontal alignment film.

The following will describe the results of considerations by the present inventors about the reasons why the reaction of the monomer is proceeded by light having a wavelength at the absorption wavelength edge of the monomer. FIG. 5 is a graph showing that an absorption wavelength of a monomer dissolved in a liquid crystal differs from that of a monomer dissolved in a solvent such as chloroform. Based on the comparison between the absorption spectrum of molecules floating in a vacuum or in a solvent and that of molecules in an aggregated state like a solid, the absorption spectrum of the solid is broader than the other as shown in FIG. 5. This is because the intermolecular interaction is stronger in solid than in liquid. In the above examples, presumably, the monomer is dissolved in the liquid crystal, and the liquid crystal molecules including many polar groups and electrons strongly interact with the monomer. Thus, the monomer may have more various molecular conformations or electron-excited states. This presumably results in a broader absorption spectrum of the monomer in the liquid crystal and elongation of the absorption wavelength edge compared with the case of dissolving the monomer in a solvent (e.g. chloroform). The degree of elongation of the wavelength is assumed to be about +40 nm based on the results of the Evaluation Tests 1 and 2.

In the case where the seal is cured by light having a wavelength of about 40 nm longer than the absorption wavelength edge of the monomer, some kinds of monomer may cause insufficient seal curing. For example, phenanthrene-2,7-diylbis(2-methyl acrylate) represented by the chemical formula (6) used in Example 2 has an absorption wavelength edge of 360 nm, and thus the light for seal curing is visible light. Curing of the sealing material by visible light prolongs the cycle time of curing treatment. Thus, it is preferable to use light having a wavelength that is shorter than the absorption wavelength edge+40 nm. In other words, the light for seal curing preferably has a wavelength that is longer than the absorption wavelength edge of the monomer and is shorter than the absorption wavelength edge+40 nm.

The present inventors have performed studies in order to achieve such improvement, and have found that a monomer concentration of 1.0% by weight or less and shielding of the display area from light upon irradiation can suppress display unevenness along the outer edge of the display area even though the sealing material is cured by light having a shorter wavelength. This method increases the degree of curing of the sealing material to improve the peeling strength and enables the seal to be cured at a low dose, thereby decreasing the cycle time. This is the spirit of the fourth manufacturing method of the present invention. The following will describe examples.

Example 6

The amount of the monomer in the liquid crystal composition was 0.4% by weight in the whole liquid crystal composition, and a filter for shielding light having a wavelength of 335 nm or shorter and a chromium-plated silica glass for shielding the display area from light were disposed between the bonded substrates and the ultra-high-pressure UV lamp, thereby shielding the display area from ultraviolet light. The other conditions were the same as those in Example 1.

The liquid crystal cell thereby produced and other parts were assembled into a liquid crystal display panel, and its display was visually observed. The observation revealed that the display was good without alignment unevenness and suffered less image sticking.

Example 7

The same procedure as in Example 1 was performed except that the amount of the monomer in the liquid crystal composition was 0.4% by weight in the whole liquid crystal composition, the monomer was phenanthrene-2,7-diylbis(2-methyl acrylate) represented by the formula (6), and a filter for shielding light having a wavelength of 370 nm or shorter and a chromium-plated silica glass for shielding the display area from light were disposed between the bonded substrates and the ultra-high-pressure UV lamp, thereby shielding the display area from ultraviolet light.

The liquid crystal cell thereby produced and other parts were assembled into a liquid crystal display panel, and its display was visually observed. The observation revealed that the display was good without alignment unevenness and suffered less image sticking.

Evaluation Test 3

In order to examine the wavelength of light for curing the sealing material which affects the polymerization of the compound represented by the chemical formula (5) used as the monomer, the following liquid crystal cells of Reference Examples 9 to 12 were produced and examined.

Reference Example 9

A liquid crystal cell of Reference Example 9 was produced by the same method as in Reference Example 1 except that the compound represented by the chemical formula (5) was used as the monomer, the amount of the monomer in the liquid crystal composition was 0.4% by weight in the whole liquid crystal composition, and the whole liquid crystal cell was subjected to the PS step such that it was irradiated with light at a dose of 1 $J/cm^2$ from an ultra-high-pressure UV lamp (USH-500D, manufactured by USHIO INC.) as a light source through a 315-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 10

A liquid crystal cell of Reference Example 10 was produced by the same method as in Reference Example 9 except that the whole liquid crystal cell was subjected to the PS step such that it was irradiated with light at a dose of 1 $J/cm^2$ from an ultra-high-pressure UV lamp (USH-500D, manufactured by USHIO INC.) as a light source through a 325-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 11

A liquid crystal cell of Reference Example 11 was produced by the same method as in Reference Example 9 except that the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 335-nm band-pass filter while shielding the display area from the light. A realignment treatment of heating this liquid crystal cell at 130° C. for 40 minutes was performed. As a result, the flow alignment of the liquid crystal was removed and the liquid crystal was uniaxially aligned without unevenness.

Reference Example 12

A liquid crystal cell of Reference Example 12 was produced by the same method as in Reference Example 9 except that the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 345-nm band-pass filter with the display area of the liquid crystal cell shielded from the light. A realignment treatment of heating this liquid crystal cell at 130° C. for 40 minutes was performed. As a result, the flow alignment of the liquid crystal was removed and the liquid crystal was uniaxially aligned without unevenness.

Consequently, shielding of light having a wavelength of at least shorter than 335 nm and shielding of the display area of the liquid crystal cell from light make it possible to suppress the polymerization of the monomer represented by the chemical formula (5) at the same time of curing the sealing material.

Evaluation Test 4

In order to examine the wavelength of light for curing the sealing material which affects the polymerization of the compound represented by the chemical formula (6) used as the monomer, the following liquid crystal cells of Reference Examples 13 to 16 were produced and examined.

Reference Example 13

A liquid crystal cell of Reference Example 13 was produced by the same method as in Reference Example 9 except that the compound represented by the chemical formula (6) was used as the monomer and the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 350-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 14

A liquid crystal cell of Reference Example 14 was produced by the same method as in Reference Example 9 except that the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 360-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 15

A liquid crystal cell of Reference Example 15 was produced by the same method as in Reference Example 9 except that the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 370-nm band-pass filter while shielding the display area from the light. A realignment treatment of heating this liquid crystal cell at 130° C. for 40 minutes was performed. As a result, the flow alignment of the liquid crystal was removed and the liquid crystal was uniaxially aligned without unevenness.

Reference Example 16

A liquid crystal cell of Reference Example 16 was produced by the same method as in Reference Example 9 except that the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 380-nm band-pass filter while shielding the display area from the light. A realignment treatment of heating this liquid crystal cell at 130° C. for 40 minutes was performed. As a result, the flow alignment of the liquid crystal was removed and the liquid crystal was uniaxially aligned without unevenness.

Consequently, shielding of light having a wavelength of at least shorter than 370 nm and shielding of the display area of the liquid crystal cell from light make it possible to suppress the polymerization of the monomer represented by the chemical formula (6) at the same time of curing the sealing material.

Evaluation Test 5

In order to examine the wavelength of light for curing the sealing material which affects the polymerization of the compound represented by the chemical formula (5) used as the monomer, the following liquid crystal cells of Reference Examples 17 to 20 were produced and examined.

Reference Example 17

A liquid crystal cell of Reference Example 17 was produced by the same method as in Reference Example 1 except that the compound represented by the chemical formula (5) was used as the monomer, the amount of the monomer in the liquid crystal composition was 1.0% by weight in the whole liquid crystal composition, and the whole liquid crystal cell was subjected to the PS step such that it was irradiated with light at a dose of 1 J/cm$^2$ from an ultra-high-pressure UV lamp (USH-500D, manufactured by USHIO INC.) as a light source through a 315-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 18

A liquid crystal cell of Reference Example 18 was produced by the same method as in Reference Example 17 except that the whole liquid crystal cell was subjected to the PS step such that it was irradiated with light at a dose of 1 J/cm² from an ultra-high-pressure UV lamp (USH-500D, manufactured by USHIO INC.) as a light source through a 325-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) of the liquid crystal composition to immobilize the alignment of the liquid crystal, and the liquid crystal held the flow alignment.

Reference Example 19

A liquid crystal cell of Reference Example 19 was produced by the same method as in Reference Example 17 except that the whole liquid crystal cell was subjected to the PS step such that it was irradiated with light at a dose of 1 J/cm² from an ultra-high-pressure UV lamp (USH-500D, manufactured by USHIO INC.) as a light source through a 335-nm band-pass filter while shielding the display area from the light. A realignment treatment of heating this liquid crystal cell at 130° C. for 40 minutes was performed. As a result, the flow alignment of the liquid crystal was removed and the liquid crystal was uniaxially aligned without unevenness.

Reference Example 20

A liquid crystal cell of Reference Example 20 was produced by the same method as in Reference Example 17 except that the whole liquid crystal cell was subjected to the PS step such that it was irradiated with light at a dose of 1 J/cm² from an ultra-high-pressure UV lamp (USH-500D, manufactured by USHIO INC.) as a light source through a 345-nm band-pass filter with the display area of the liquid crystal cell shielded from the light. A realignment treatment of heating this liquid crystal cell at 130° C. for 40 minutes was performed. As a result, the flow alignment of the liquid crystal was removed and the liquid crystal was uniaxially aligned without unevenness.

Consequently, shielding of light having a wavelength of at least shorter than 335 nm and shielding of the display area of the liquid crystal cell from light make it possible to suppress the polymerization of the monomer represented by the chemical formula (5) at the same time of curing the sealing material.

Evaluation Test 6

In order to examine the wavelength of light for curing the sealing material which affects the polymerization of the compound represented by the chemical formula (6) used as the monomer, the following liquid crystal cells of Reference Examples 21 to 24 were produced and examined.

Reference Example 21

A liquid crystal cell of Reference Example 21 was produced by the same method as in Reference Example 17 except that the compound represented by the chemical formula (6) was used as the monomer and the whole liquid crystal cell was subjected to the PS step such that it was irradiated with light at a dose of 1 J/cm² from an ultra-high-pressure UV lamp (USH-500D, manufactured by USHIO INC.) as a light source through a 350-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 22

A liquid crystal cell of Reference Example 22 was produced by the same method as in Reference Example 17 except that the whole liquid crystal cell was subjected to the PS step such that it was irradiated with light at a dose of 1 J/cm² from an ultra-high-pressure UV lamp (USH-500D, manufactured by USHIO INC.) as a light source through a 360-nm band-pass filter while shielding the display area from the light. A realignment treatment of heating this liquid crystal cell at 130° C. for 40 minutes was performed. As a result, the PS polymerization proceeded in the region along the sealing material (the outer edge of the display area) in the liquid crystal composition to immobilize the alignment of the liquid crystal, and the liquid crystal held the flow alignment.

Reference Example 23

A liquid crystal cell of Reference Example 23 was produced by the same method as in Reference Example 17 except that the whole liquid crystal cell was subjected to the PS step such that it was irradiated with light at a dose of 1 J/cm² from an ultra-high-pressure UV lamp (USH-500D, manufactured by USHIO INC.) as a light source through a 370-nm band-pass filter while shielding the display area from the light. A realignment treatment of heating this liquid crystal cell at 130° C. for 40 minutes was performed. As a result, the flow alignment of the liquid crystal was removed and the liquid crystal was uniaxially aligned without unevenness.

Reference Example 24

A liquid crystal cell of Reference Example 24 was produced by the same method as in Reference Example 17 except that the whole liquid crystal cell was subjected to the PS step such that it was irradiated with light at a dose of 1 J/cm² from an ultra-high-pressure UV lamp (USH-500D, manufactured by USHIO INC.) as a light source through a 380-nm band-pass filter while shielding the display area from the light. A realignment treatment of heating this liquid crystal cell at 130° C. for 40 minutes was performed. As a result, the flow alignment of the liquid crystal was removed and the liquid crystal was uniaxially aligned without unevenness.

Consequently, shielding of light having a wavelength of at least shorter than 370 nm and shielding of the display area of the liquid crystal cell from light make it possible to suppress the polymerization of the monomer represented by the chemical formula (6) at the same time of curing the sealing material.

Example 8

The present example utilized linearly polarized ultraviolet light at a dose of 1.5 J/cm² from a UV-B ultraviolet lamp (FHF32-UVB, manufactured by Sankyo Denki Co., Ltd.) in combination with a polarizing film for the PS treatment on the liquid crystal cell, although Example 1 utilized unpolarized ultraviolet light. The degree of polarization was 10:1.

The polarization direction was the same as the polarization direction of light in the alignment treatment on the photo-alignment film. Except for these conditions, a liquid crystal cell was produced in the same manner as in Example 1. The liquid crystal in this liquid crystal cell was uniaxially aligned without unevenness, and the alignment characteristic of the liquid crystal was better than that in Example 1 and the contrast ratio was about 10% higher than that of Example 1.

Example 9

A liquid crystal cell was produced in the same manner as in Example 2 except that the same linearly polarized ultraviolet light as in Example 8 was applied in the PS treatment. The liquid crystal in this liquid crystal cell was uniaxially aligned without unevenness, and the alignment characteristic of the liquid crystal was better than that in Example 2 and the contrast ratio was about 10% higher than that in Example 2.

Example 10

A liquid crystal cell was produced in the same manner as in Example 5 except that the same linearly polarized ultraviolet light as in Example 8 was applied in the PS treatment. The liquid crystal in this liquid crystal cell was uniaxially aligned without unevenness, and the alignment characteristic of the liquid crystal was better than that in Example 5 and the contrast ratio was about 5% higher than that in Example 5.

Example 11

A liquid crystal cell was produced in the same manner as in Example 6 except that the same linearly polarized ultraviolet light as in Example 8 was applied in the PS treatment. The liquid crystal in this liquid crystal cell was uniaxially aligned without unevenness, and the alignment characteristic of the liquid crystal was better than that in Example 6 and the contrast ratio was about 10% higher than that in Example 6.

Example 12

A liquid crystal cell was produced in the same manner as in Example 7 except that the same linearly polarized ultraviolet light as in Example 8 was applied in the PS treatment. The liquid crystal in this liquid crystal cell was uniaxially aligned without unevenness, and the alignment characteristic of the liquid crystal was better than that in Example 7 and the contrast ratio was about 10% higher than that in Example 7.

The present application claims priority to Patent Application No. 2011-183797 filed in Japan on Aug. 25, 2011 under the Paris Convention and provisions of national law in a designated State, the entire contents of which are hereby incorporated by reference.

REFERENCE SIGNS LIST 3, 33, 43, 53, 63: polymerizable monomer
10: array substrate
11, 21: transparent substrate
12, 22: horizontal alignment film
13, 23: PS layer (polymer layer)
20: color filter substrate
30: liquid crystal layer
32, 42: alignment film
33a, 43a: polymerizable monomer (not excited)
33b, 43b: polymerizable monomer (excited)
52: photoactive group (vertical alignment film molecule)
54, 64, 74: liquid crystal molecules
55: hydrophobic group
62: photoactive group (horizontal alignment film molecule)
71: slitted electrode
71a: slit
72: plate electrode
81: sealing material

The invention claimed is:

1. A method for manufacturing a liquid crystal display device, comprising the steps of:
    forming an alignment film on at least one substrate of a pair of substrates;
    dropping a liquid crystal composition containing a liquid crystal material and a monomer on one substrate of the pair of substrates, the monomer being contained in an amount of 0.4% by weight or less in the whole liquid crystal composition;
    curing a sealing material applied to one substrate of the pair of substrates along an outer edge thereof by irradiating the sealing material with light whose wavelength is 10 nm or more longer than an absorption wavelength edge of the monomer while shielding a display area from the light; and
    forming a polymer layer that controls the alignment of liquid crystal molecules adjacent thereto on the alignment film by irradiating the liquid crystal composition sealed between the pair of substrates with light to polymerize the monomer.

2. The method for manufacturing a liquid crystal display device according to claim 1,
    wherein the alignment film is a horizontal alignment film containing a photoactive material.

3. The method for manufacturing a liquid crystal display device according to claim 2,
    wherein the photoactive material is a photo-alignment film material.

4. The method for manufacturing a liquid crystal display device according to claim 3,
    wherein the photo-alignment film material includes a compound containing a cyclobutane skeleton.

5. The method for manufacturing a liquid crystal display device according to claim 3,
    wherein the photo-alignment film material includes a compound containing either one of or both of a photoisomerizable functional group and a photodimerizable functional group.

6. The method for manufacturing a liquid crystal display device according to claim 5,
    wherein the photoisomerizable or photodimerizable functional group is a cinnamate group or a derivative thereof.

7. The method for manufacturing a liquid crystal display device according to claim 2,
    wherein the light used in the step of forming a polymer layer that controls the alignment of liquid crystal molecules adjacent thereto on the horizontal alignment film by polymerizing the monomer is linearly polarized light.

8. The method for manufacturing a liquid crystal display device according to claim 1,
    wherein a polymerizable functional group of the monomer is an acrylate group, a methacrylate group, a vinyl group, or a vinyloxy group.

9. The method for manufacturing a liquid crystal display device according to claim 1,
wherein the liquid crystal composition contains liquid crystal molecules including a multiple bond other than conjugated double bonds of a benzene ring in a molecular structure thereof.

10. The method for manufacturing a liquid crystal display device according to claim 9,
wherein the multiple bond is a double bond.

11. The method for manufacturing a liquid crystal display device according to claim 9,
wherein the double bond is present in an alkenyl group.

12. The method for manufacturing a liquid crystal display device according to claim 1,
wherein the alignment mode of the liquid crystal layer is an IPS mode, an FFS mode, an OCB mode, a TN mode, an STN mode, an FLC mode, or a PDLC mode.

13. The method for manufacturing a liquid crystal display device according to claim 12,
wherein at least one of the pair of substrates includes a multi-domain structure.

* * * * *